United States Patent
Liu et al.

(10) Patent No.: US 11,803,326 B2
(45) Date of Patent: Oct. 31, 2023

(54) IMPLEMENTING A READ SETUP BURST COMMAND IN 3D NAND FLASH MEMORY TO REDUCE VOLTAGE THRESHOLD DEVIATION OVER TIME

(71) Applicant: MACRONIX INTERNATIONAL CO., LTD., Hsinchu (TW)

(72) Inventors: Chien-Hsin Liu, Hsinchu (TW); Yu-Chih Yeh, Hsinchu (TW); Chin-Chu Chung, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 321 days.

(21) Appl. No.: 17/238,757

(22) Filed: Apr. 23, 2021

(65) Prior Publication Data

US 2022/0342597 A1 Oct. 27, 2022

(51) Int. Cl.
*G06F 3/00* (2006.01)
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0688* (2013.01)

(58) Field of Classification Search
CPC ...... G06F 3/0659; G06F 3/0604; G06F 3/064; G06F 3/0688
See application file for complete search history.

(56) References Cited

U.S. PATENT DOCUMENTS

| | | | |
|---|---|---|---|
| 6,327,638 B1 * | 12/2001 | Kirby | G06F 3/0608 711/4 |
| 7,007,193 B1 * | 2/2006 | Fuld | G06F 11/1088 714/6.21 |
| 9,230,665 B2 | 1/2016 | Hosono | |
| 10,211,218 B2 | 2/2019 | Lue | |
| 10,360,101 B2 | 7/2019 | Kodama et al. | |
| 10,521,287 B2 | 12/2019 | Khoueir et al. | |
| 11,270,776 B1 | 3/2022 | Lien et al. | |
| 2002/0039311 A1 | 4/2002 | Takeuchi et al. | |
| 2004/0061704 A1 * | 4/2004 | Ju | G06T 9/004 375/E7.094 |

(Continued)

FOREIGN PATENT DOCUMENTS

TW 202038232 A 10/2020

OTHER PUBLICATIONS

U.S. Office Action in U.S. Appl. No. 17/153,525 dated Mar. 31, 2022, 12 pages.

(Continued)

*Primary Examiner* — Craig S Goldschmidt
(74) *Attorney, Agent, or Firm* — Andrew L. Dunlap; Haynes Beffel & Wolfeld LLP

(57) ABSTRACT

A memory comprising a memory array, including a plurality of blocks, and control circuits comprising logic to execute operations is provided. The operations include decoding a read setup burst command identifying (i) an address of a first read setup block in a set of read setup blocks and (ii) a number of read setup blocks, as candidates for read setup operations. The operations further including, in response to the decoding of the read setup burst command, performing a read setup burst operation on a plurality of read setup blocks of the set of read setup blocks.

20 Claims, 16 Drawing Sheets

(56) References Cited

U.S. PATENT DOCUMENTS

| | | |
|---|---|---|
| 2005/0146959 A1 | 7/2005 | Shiga |
| 2007/0140016 A1 | 6/2007 | Kamei |
| 2012/0047548 A1* | 2/2012 | Rowlands ........ H04N 21/23805 |
| | | 725/142 |
| 2012/0278819 A1* | 11/2012 | Cho ..................... G06F 13/385 |
| | | 719/325 |
| 2014/0016413 A1 | 1/2014 | Han et al. |
| 2016/0179402 A1 | 6/2016 | Iwashiro et al. |
| 2016/0205054 A1 | 7/2016 | Lu et al. |
| 2017/0185299 A1 | 6/2017 | Conley et al. |
| 2020/0012598 A1 | 1/2020 | Feng et al. |
| 2020/0226080 A1 | 7/2020 | Tarango et al. |
| 2020/0278808 A1* | 9/2020 | Zhu ..................... G06F 3/0679 |
| 2021/0366561 A1 | 11/2021 | Senoo |
| 2022/0028460 A1 | 1/2022 | Kurose et al. |
| 2022/0068390 A1 | 3/2022 | Wang et al. |

OTHER PUBLICATIONS

U.S. Office Action in U.S. Appl. No. 17/234,236 dated Apr. 19, 2022, 16 pages.

Spinelli, et al., "Reliability of NAND Flash Memories: Planar Cells and Emerging Issues in 3D Devices," Computers. 2017; 6(2), Apr. 21, 2017, 55 pages.

Zambelli, et al., "First Evidence of Temporary Read Errors in TLC 3D-NAND Flash Memories exiting from an Idle State," IEEE J. of the Electron Devices Society, vol. 8, Jan. 10, 2020, 6 pages.

\* cited by examiner

IMPLEMENTING A READ SETUP BURST COMMAND IN 3D NAND FLASH MEMORY TO REDUCE VOLTAGE THRESHOLD DEVIATION OVER TIME

BACKGROUND

Field

The technology disclosed relates to integrated circuit memory, including nonvolatile NAND flash memory and operating the same. In particular, the technology disclosed relates to performing read setup operations in NAND flash memory by implementing a read setup burst command to reduce voltage threshold distribution deviation over time.

Description of Related Art

NAND flash memory suffers a problem in that threshold voltages of cells can deviate over time, eventually and unintentionally changing logical states of cells. For example, this deviation of the threshold voltage can happen to a particular row of cells as a result of reading data from another row of cells. While error correcting codes (ECC) can be implemented to correct for read errors that occur as a result of the unintentional change of the logical states of the cells, error correction has limited capabilities.

Therefore, it is desirable to prevent the deviation of the threshold voltages of cells of NAND flash memory.

SUMMARY

The technology disclosed describes a method of operating a memory that implements a read setup burst command to reduce voltage threshold deviation over time. The technology disclosed also describes a memory including control circuits that perform a read setup burst operation that reduces voltage threshold deviation over time. The technology disclosed further describes a controller that generates and provides a read setup burst command to the memory for implementing a read setup burst operation that reduces voltage threshold deviation over time.

In an embodiment, a memory is provided. The memory can include a memory array, comprising a plurality of blocks, and control circuits comprising logic to execute operations. The operations can include decoding a read setup burst command identifying (i) an address of the first read setup block in a set of read setup blocks and (ii) a number of read setup blocks, as candidates for read setup operations, and in response to the decoding of the setup burst command, performing a read setup burst operation on a plurality of read setup blocks of the set of read setup blocks.

In a further embodiment, the set of read setup blocks consists of sequential blocks.

In another embodiment, the number can represent a number of the sequential read setup blocks and the read setup burst operation can include performing read setup operations on the sequential read setup blocks of the set of read setup blocks starting from the first read setup block, as identified from the address included in the read setup burst command and continuing in sequential order of the sequential read setup blocks until a number of sequential read setup blocks that have had read setup operations performed thereon equals the number, as identified in the read setup burst command.

In an embodiment, the read setup burst operation can further include prior to performing the read setup operation on each respective read setup block of the sequential read setup blocks, determining whether the respective sequential read setup block is a bad block, and in response to determining that the respective sequential read setup block is a bad block, skipping the read setup operation for the respective sequential read setup block and continuing the performing of the read setup burst operation in the sequential order for a subsequent read setup block in the sequence.

In another embodiment, the number can represent a number of the sequential read setup blocks and the read setup burst operation can includes identifying, as a current read setup block, the first read setup block in dependence upon on the address included in the received read setup burst command, setting a counter c to equal the number of the identified sequential read setup blocks included in the received read setup burst command, the number being greater than 1, and until the counter c equals 0, performing the following operations: (i) determining whether or not the current read setup block is a bad block, (ii) in response to a determination that the current read setup block is not a bad block, performing a read setup operation on the current read setup block, (iii) upon a determination that the current read setup block is not the last block of the sequential read setup blocks, identifying the current read setup block as a subsequent block of the sequence of the sequential read setup blocks, and (iv) decreasing the counter c by a value of 1.

In an embodiment the operations can further comprise receiving a read setup list of candidate read setup blocks and storing and maintaining the received read setup list of candidate read setup blocks in a candidate list buffer, wherein the set of read setup blocks identifies one or more of candidate read setup blocks in the read setup list.

In a further embodiment the operations can further include determining whether any of the candidate read setup blocks are in sequential order as addressed in the memory, and in response to a determination that there are candidate read setup blocks in sequential order, identifying the candidate read setup blocks that are in the sequential order as the plurality of read setup blocks of the set of read setup blocks upon which the read setup burst operation is performed.

In another embodiment, the operations can further include identifying a first set of candidate read setup blocks from the read setup list, the first set including two or more candidate read setup blocks that are in sequential order as addressed in the memory, identifying a second set of candidate read setup blocks from the read setup list, the second set including two or more candidate read setup blocks that are in sequential order as addressed in the memory, the second set including candidate read setup blocks that are different from the candidate read setup blocks included in the first set, determining that the second set of candidate read setup blocks includes more candidate read setup blocks than the first set of candidate read setup blocks, and identifying the candidate read setup blocks from the second set as the plurality of read setup blocks of the set of read setup blocks upon which the read setup burst operation is performed.

In an embodiment, the read setup list can be generated from a least recently used (LRU) queue that identifies blocks of the memory in dependence upon their use.

In another embodiment, the read setup list can be generated to identify candidate read setup blocks from the LRU queue that have not been accessed for a period of time that exceeds a predetermined threshold.

In an embodiment, a method of a memory performing a read setup burst operation is provided. The memory can include a memory array, comprising a plurality of blocks, and the method can include decoding a read setup burst command identifying (i) an address of the first read setup block in a set of read setup blocks and (ii) a number of read setup blocks, as candidates for read setup operations, and in response to the decoding of the setup burst command, performing a read setup burst operation on a plurality of read setup blocks of the set of read setup blocks.

In another embodiment a method of operating a memory is provided. The method can include identifying a set of read setup blocks of the memory as candidates for read setup operations, generating a read setup burst command identifying (i) an address of the first read setup block in the set of read setup blocks and (ii) a number of read setup blocks, as candidates for read setup operations, and sending the generated read setup burst command to the memory to initiate performing of a read setup burst operation on a plurality of read setup blocks of the set of read setup blocks.

In a further embodiment, the method can further include sending a polling message to the memory requesting information regarding a status of the read setup burst operation, and receiving a response message from the memory indicating that the read setup burst operation is not complete.

In an embodiment, the method can include sending a polling message to the memory requesting information regarding a status of the read setup burst operation, receiving a response message from the memory indicating that the read setup burst operation is complete, and in response to receiving the message indicating that the read setup burst operation is complete, generating a subsequent read setup burst command and sending the subsequent read setup burst command to the memory.

In another embedment, the method can include sending a polling message to the memory requesting information regarding a status of the read setup burst operation and in response to not receiving a response message from the memory within a predetermined period of time, determining that the read setup burst operation is not complete.

In a further embodiment, the set of read setup blocks can consist of sequential blocks.

In another embodiment, the number can represent a number of the sequential read setup blocks and the read setup burst operation can include performing read setup operations on the sequential read setup blocks starting from the first read setup block, as identified from the address included in the read setup burst command, and continuing in sequential order of the sequential read setup blocks until a number of sequential read setup blocks that have had read setup operations performed thereon equals the number, as identified in the read setup burst command.

In an embodiment the read setup burst operation can further include, prior to performing the read setup operation on each respective read setup block of the sequential read setup blocks, determining whether the respective sequential read setup block is a bad block, and in response to determining that the respective sequential read setup block is a bad block, skipping the read setup operation for the respective sequential read setup block and continuing the performing of the read setup burst operation in the sequential order for a subsequent read setup block in the sequence.

In an embodiment, the method can further include maintaining a read setup list of candidate read setup blocks in memory, and wherein the set of read setup blocks includes candidate read setup blocks in the read setup list.

In a further embodiment, the method can include determining whether any of the candidate read setup blocks are in sequential order as addressed in the memory, and in response to a determination that there are candidate read setup blocks in sequential order, identifying the candidate read setup blocks that are in the sequential order as the plurality of read setup blocks of the set of read setup blocks upon which the read setup burst operation is performed.

Other aspects and advantages of the technology disclosed can be seen on review of the drawings, the detailed description and the claims, which follow.

DETAILED DESCRIPTION

A detailed description of embodiments of the technology disclosed is provided with reference to the FIGS. 1-16.

Figure 1:
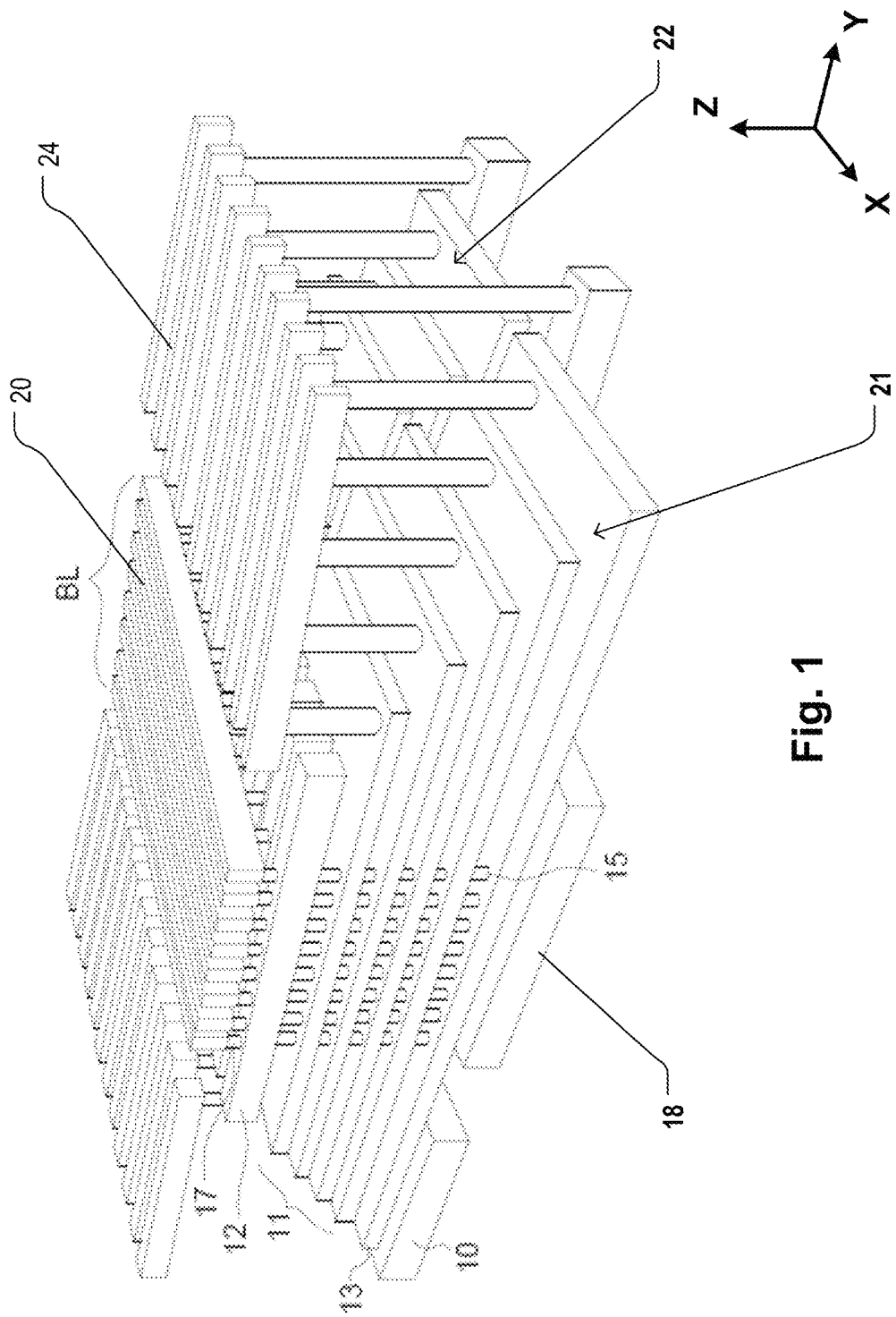
FIG. 1 is a perspective view of a 3D vertical NAND structure, having a block and sub-block architecture.

FIG. 1 is a perspective view of a 3D semiconductor device including a plurality of blocks and sub-blocks of memory cells in a plurality of vertical NAND strings. It comprises a multilevel stack of word line layers 11 configured as a first stack 21 of word line layers and a second stack 22 of word line layers, each parallel to the substrate 10, and a plurality of pillars 15 oriented orthogonally to the substrate in the Z direction as labeled in this figure extending through corresponding stacks of word line layers. The pillars comprise respective semiconductor bodies providing channels, which can be thin film channels less than 10 nm thick, of a plurality of series-connected memory cells located at cross-points between the pillars and the word lines in a NAND string configuration. A plurality of string select lines (SSLs) 12 is oriented parallel to the substrate in the Y direction, as labeled in this figure, and above the word line layers 11. In this example, first and second blocks of memory cells are formed in the first stack 21 and in the second stack 22, respectively, each coupled to different sets of NAND strings. Each of the string select lines intersects a respective distinct subset (e.g., one or more rows) of the set of pillars in a corresponding block, where each sub-block of memory cells in the corresponding block is formed in a subset of pillars coupled to a respective string select line.

The structure also includes a plurality of parallel global bit line conductors 20 in a layer parallel to the substrate extending in the X direction as labeled in this figure, and above the string select lines. Each of the global bit line conductors superposes a respective column of the pillars in the array across multiple blocks, each column including one pillar in each subset of pillars for each string select line.

Each intersection of a pillar and a string select line defines a select gate of the pillar for connection to a corresponding bit line. Each of the pillars underlies and is coupled by the select gate of the pillar to one of the bit line conductors.

Lower select lines (lower SG) 13 are formed under the word line layers 11 to couple the pillars to one or more source lines such as a common source conductor 18. The common source conductor can be connected to bias circuitry by vertical connections between the blocks, or otherwise.

The structure of FIG. 1 is one example of a memory including a plurality of blocks of memory cells and a plurality of bit lines, each block including a group of word lines (i.e., a stack in FIG. 1), and a set of NAND strings having string select gates for connection to corresponding bit lines in the plurality of bit lines, and in which each NAND string in the set of NAND strings of the block is connected to the group of word lines. Also, it is an example of a memory in which each block in the plurality of blocks of memory cells has a plurality of sub-blocks, each sub-block including a distinct subset of the set of NAND strings of the block. Also, in this example, the distinct subset of NAND strings in each sub-block is operatively connected to a respective sub-block string select line by which gate voltages are applied to the string select gates of the NAND strings in the distinct subset of the sub-block.

In structures like that illustrated in FIG. 1, an operation can be applied to limit the impact of the changing resistivities of channel semiconductor materials over time. For example, in some memory architectures when programming the memory cells, the channel polysilicon is stressed so that the thresholds set by the program are based on the stressed condition resistivities. To address this issue, a stress read bias can be applied to stress memory cells to be read. After the stress read, the channel can maintain the stressed condition for an interval of time, such as 10 minutes or so. So, the cell may be read within that interval without requiring another stress read bias.

Figure 2:
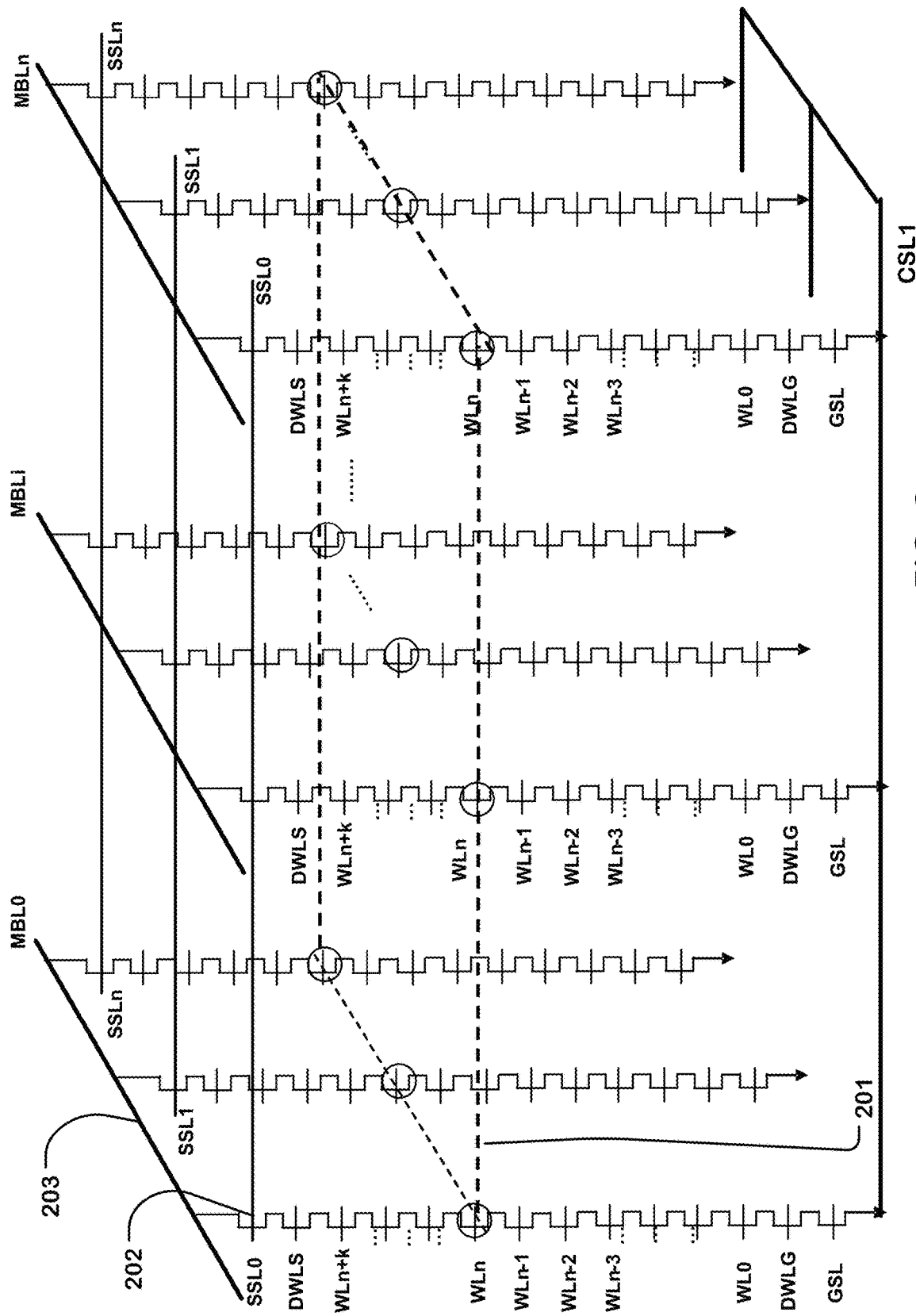
FIG. 2 is a circuit schematic diagram of a block of NAND flash memory cells, which can be implemented using an architecture like that of FIG. 1.

FIG. 2 is a schematic diagram of a block of memory cells in a 3D NAND device which can comprise many blocks, and in which a block includes a plurality of sub-blocks. In the schematic, a plurality of global bit lines MBL0 to MBLn overlies an array of NAND strings arranged in rows and columns. Each of the NAND strings comprises a series-connected string of memory cells, such as dielectric charge trapping memory cells, between a corresponding bit line and a reference line such as the common source line CSL. In some embodiments, the common source line for a block can be implemented as one or more reference lines, and may be coupled to biasing circuitry by which operating voltages are applied in various operations of the memory.

In a 3D NAND arrangement, the set of NAND strings of the block shown in FIG. 2 correspond with pillars of FIG. 1, for example. The NAND strings of the plurality of NAND strings are coupled with a corresponding stack of word lines WL0 to WLn+k, in which each word line is coupled to memory cells at its layer, in all the NAND strings in the block, in this example. At word line WLn, the planar structure of each of the word line layers is represented by the dashed line 201. Thus, all the memory cells in the block at the level of a given word line, such as WLn, in the block are coupled to that given word line, such as WLn, so that they can be activated by voltages applied to the given word line.

Also, each of the NAND strings includes a corresponding sub-block string select gate (e.g., 202) configured to connect the NAND string to a particular bit line (e.g., 203) in the plurality of bit lines.

A plurality of sub-block string select lines SSL0 to SSLn are operatively coupled to the string select gates of respective distinct subsets of NAND strings, where each subset of NAND strings includes a sub-block of the block of memory cells, to apply gate voltages to the sub-block string select gates.

Also, each of the NAND strings includes a corresponding lower select gate configured to connect the NAND string to the common source line or one of the one or more reference lines used to implement the common source line. A lower select gate layer GSL is coupled to all the lower select gates for the NAND strings in the block in this example. In another example, there can be a plurality of lower select gate lines arranged for connection to the lower select gates in the block.

In this example, a lower dummy word line DWLG lies between the lower select gate layer GSL and the lowest word line layer WL0, and an upper dummy word layer DWLS lies between the string select lines SSL0 to SSLn and the uppermost word line layer WLn+k.

In the circuit of FIG. 2, in order to select a particular memory cell in the block, a sub-block is activated by a sub-block string select line which connects each NAND string in the selected sub-block to a respective bit line in the plurality of bit lines, and a word line layer is selected which selects one memory cell at the level of the selected word line on each NAND string in the selected sub-block. The selected memory cell is activated by selecting one bit line corresponding to the NAND string in which the selected memory cell is located. This arrangement enables activation of a plurality of memory cells in parallel, one in each of the NAND strings of the selected sub-block, via its corresponding bit line and word line layer.

"Activate", as used herein, means to apply a particular bias so as to give effect to the connected cells or switches.

The bias may be high or low, depending on the operation and the memory design. For the purposes of this description, the term "charging" refers to both driving the node to a higher voltage and driving the node to a lower voltage, including ground and negative voltages in some embodiments.

A NAND block as described herein can be implemented using a 3D NAND memory technology. Implementations can also be made using 2D NAND technology, in which the NAND block is logically defined across the plurality of 2D NAND arrays.

Figure 3:
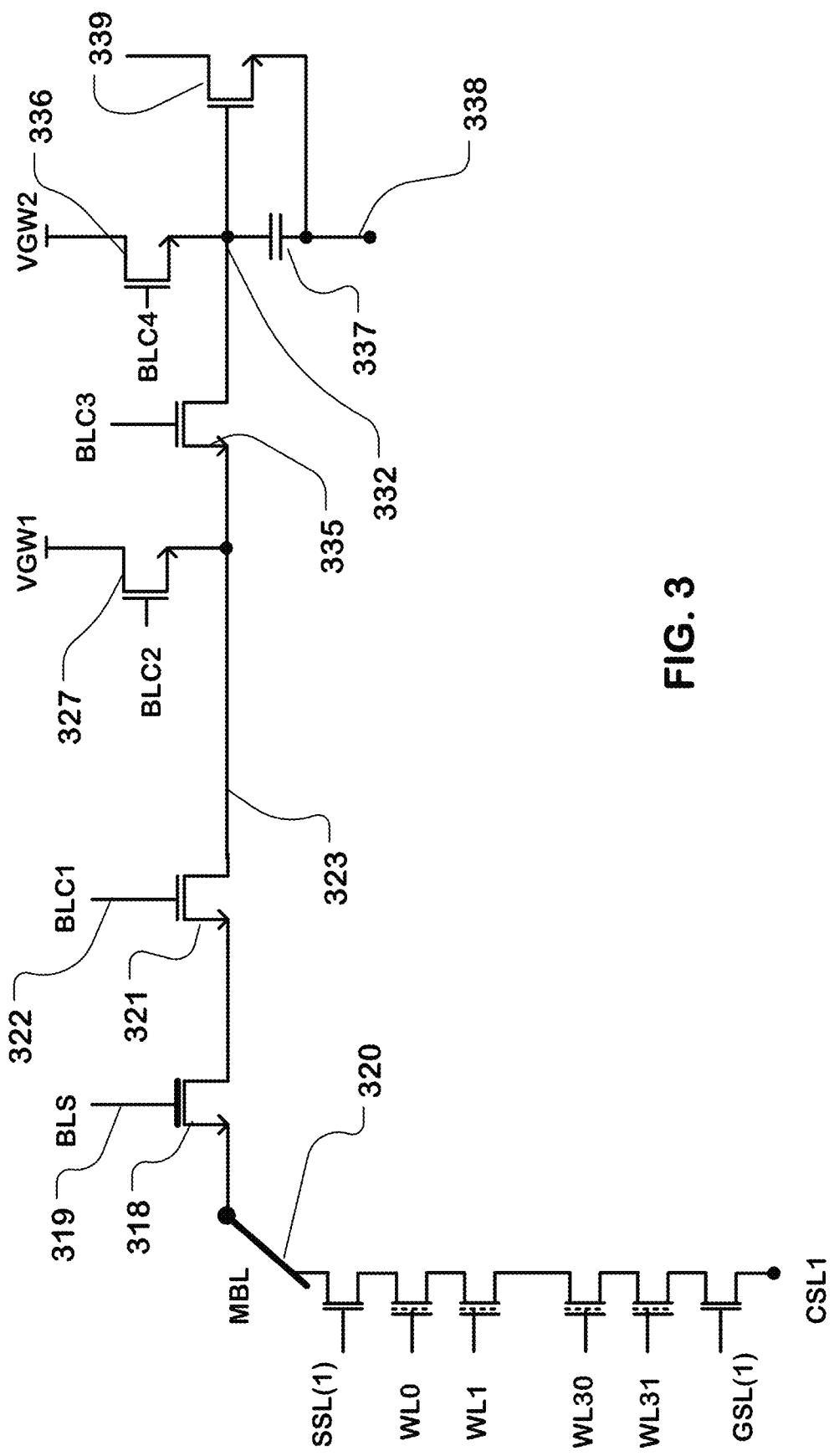
FIG. 3 is a simplified schematic diagram of a sense amplifier and bit line bias circuit usable in a device as described herein.

FIG. 3 illustrates the structure of a sense amplifier and bit line bias circuit which can be used to apply bias voltages to each bit line in the plurality of bit lines. A page buffer can include one sense amplifier and bit line bias circuit each bit line coupled to a selected block of the array.

The circuit in FIG. 3 is connected to a global bit line 320. A bit line select transistor 318 has a first source/drain terminal connected to the global bit line 320 and a second source/drain terminal. A gate of the bit line select transistor 318 is connected to a control signal BLS on line 319. A bit line clamp transistor 321 has a first source/drain terminal connected to the second source/drain terminal of transistor 318, and a second source/drain terminal connected to connecting node 323. The bit line clamp transistor 321 has its gate connected to the BLC1 line 322 at which bias voltages are applied by circuits not shown to control the voltage level of the MBL during precharge operations and other operations. A transistor 327 is provided for connecting node 323 to BLC2 line at which bias voltages are applied by circuits not shown. A pass transistor 335 is connected between connecting node 323 and a sensing node 332.

The pass transistor 335 is controlled by a control signal BLC3, which controls connection and disconnection of the connecting node 323 to the sensing node 332. A transistor 336 is connected between the sensing node 332 and a bias voltage VGW2, and is controlled by signal BLC4. A capacitor 337 (capacitance) is coupled from sensing node 332 to a sense signal node 338. A sensing transistor 339 has a gate connected to the sensing node 332, a first current carrying terminal connected to the sense pulse node 338 and a second current carrying terminal providing a sense amplifier output, which can be connected to latches of a page buffer.

During read operations and other operations, the transistors 318, 327 and 321 can be operated to set a bias voltage level on the selected bit lines as suits a particular operation.

Figure 4:
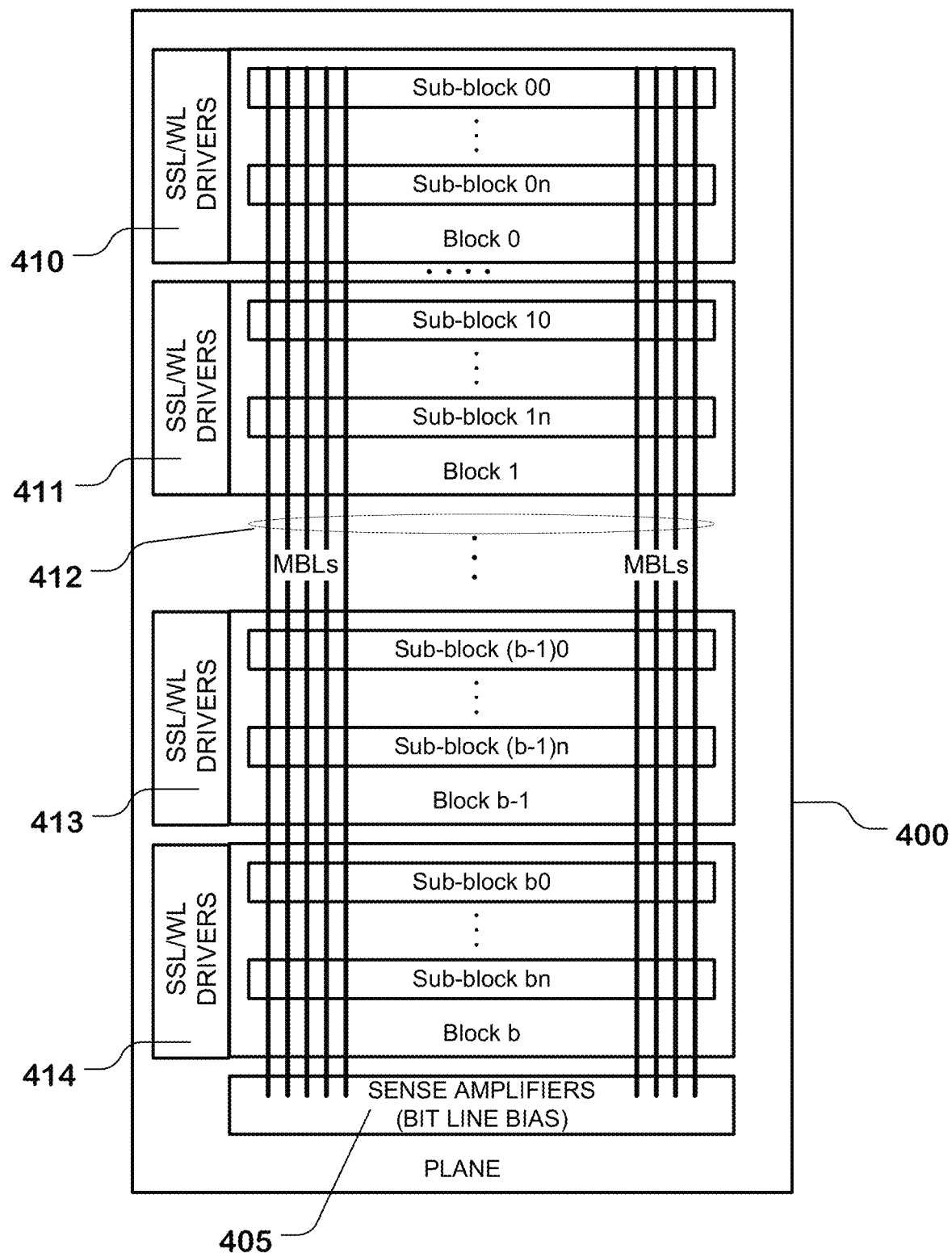
FIG. 4 is a block diagram of a segmentation of a memory plane according to embodiments described herein.
Figure 5:
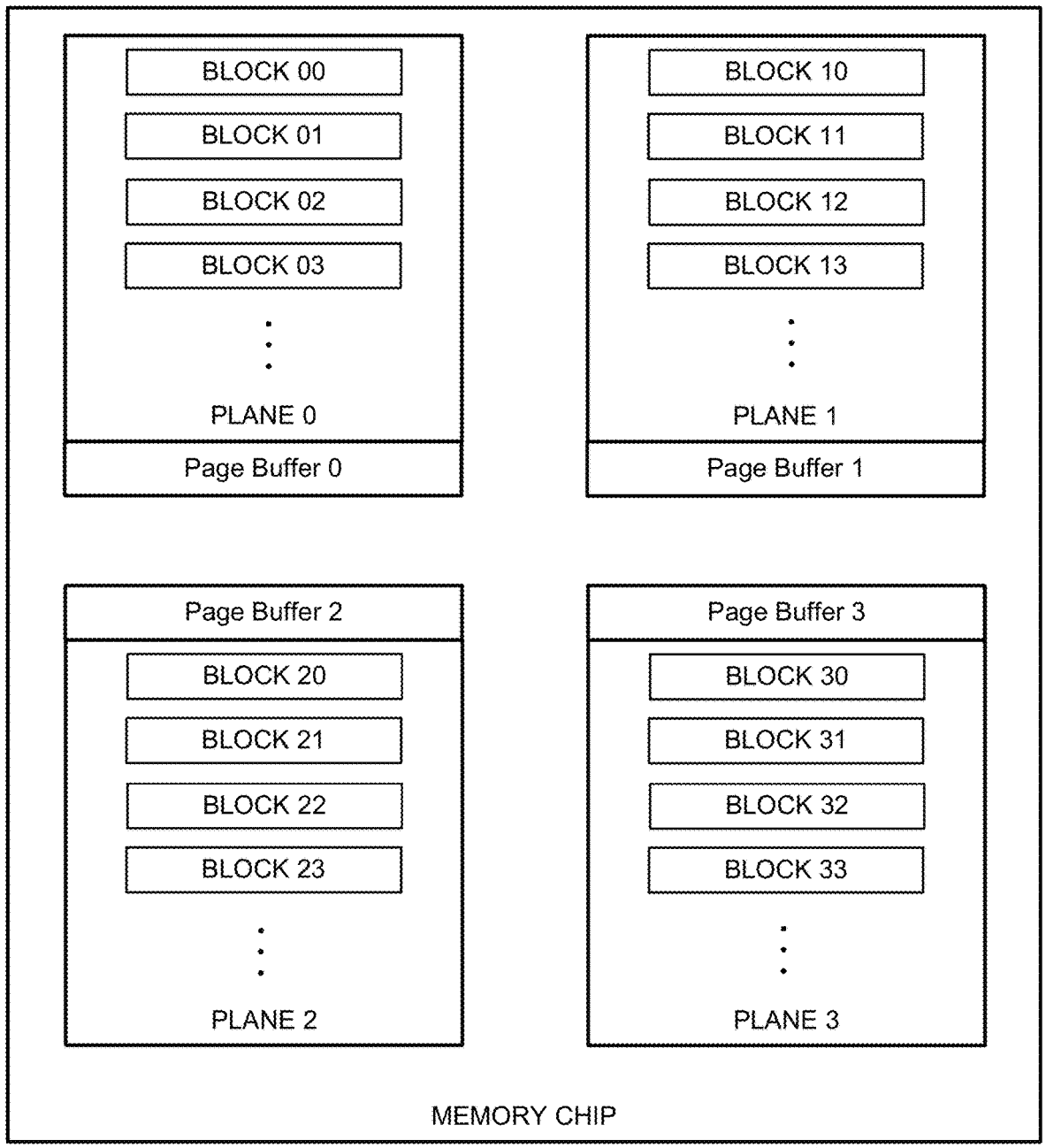
FIG. 5 is a block diagram of a segmentation of a memory array including multiple planes, according to embodiments described herein.

FIGS. 4 and 5 illustrate segmentation of a memory array on a memory device on a plane, block and sub-block levels according to one example to which the technology described herein can be applied. The technology described includes applying read setup operations that comprise applying bias voltages simultaneously to a plurality of memory cells to condition the plurality of memory cells for a subsequent read operation and also to prevent voltage threshold deviation of the memory cells. The conditioning can condition the memory cell so that the threshold voltages match or are close to the threshold voltages established during a program operation as mentioned above.

FIG. 4 illustrates a configuration of a single plane 400 in a memory array. The plane 400 includes a plurality of blocks, Block 0, Block 1, . . . Block (b−1) and Block(b). Each of the blocks includes a plurality of sub-blocks. Thus, block 0 includes sub-block 00 to sub-block 0n, block 1 includes sub-block 10 to sub-block 1n, Block (b−1) includes sub-block (b−1)0 two sub-block (b−1)n and Block b includes sub-block (b)0 two sub-block (b)n.

A plurality of global bit lines 412 (MBLs) superimposes, and is shared by, all of the blocks in the plane. A set of sense amplifiers and bit line bias circuits 405 (e.g., FIG. 3) which can be part of page buffer circuits, is coupled to the plurality of global bit lines 412, by which bias voltages can be applied to the global bit lines 412 in support of the read setup operations. The set of sense amplifiers and bit line bias circuits 405 is shared by all of the blocks in the plane. Each of the blocks includes corresponding string select line SSL and word line WL drivers 410, 411, 413, 414, by which bias voltages can be applied in support of the read setup operations. Also, a common source line driver can be applied to each of the blocks.

A read setup operation can be applied to only one block at a time in a given plane in some embodiments. In other embodiments, a read setup operation can be applied to multiple blocks simultaneously in a given plane. In other embodiments, the read setup operation for a block having a number "n" of sub-blocks, can be applied more than one and fewer than "n" sub-blocks simultaneously. In other embodiments, the read setup operation can be applied to one or more sub-blocks in one block and one or more sub-blocks in another block of the plane simultaneously.

FIG. 5 illustrates a memory 500 including multiple planes, Plane 0, Plane 1, Plane 2 and Plane 3 in this example. Each of the planes includes distinct page buffer circuits, including Page Buffer 0, Page Buffer 1, Page Buffer 2, Page Buffer 3. The Page Buffers are coupled to input/output circuitry not shown, supporting high throughput memory operations on the multiple planes. As illustrated, each of the planes includes a plurality of blocks. Plane 0 includes Block 00, Block 01, Block 02, Block 03, . . . . Plane 1 includes Block 10, Block 11, Block 12, Block 13, . . . . Plane 2 includes Block 20, Block 21, Block 22, Block 23, . . . . Plane 3 includes Block 30, Block 31, Block 32, Block 33, . . . .

A read setup operation can be applied to one block or multiple blocks in a single plane as discussed with reference to FIG. 5 to prevent voltage threshold deviation of the memory cells so that the threshold voltages match or are close to the threshold voltages established during a program operation as mentioned above. Also, a read setup operation can be applied to one block or multiple blocks in one plane, and one block or multiple blocks in another plane simultaneously in some embodiments. Also, a read setup operation can be applied to one or more sub-blocks in one block of one plane, and one or more sub-blocks in one block of another plane simultaneously. Also, read setup operations can be applied to other read setup units, other than sub-block, block and plane units as suits a particular memory configuration.

FIG. 6 through FIG. 11 illustrate alternative embodiments of read setup bias arrangements to be applied in read setup operations as described herein to a plurality of memory cells in parallel, simultaneously. The bias arrangements applied during a read setup operation can be determined based on the memory structure of the memory array, by trial and error or by simulation. In general, the bias arrangements applied during read setup operations should be set so as to prevent disturbing charge stored in the memory cells by amounts that could cause loss of data. In general, such bias arrangements will have voltages on the order of those applied during normal read operations.

FIGS. 6-16 are examples and flow charts of operations that can be utilized to perform read setup procedures as described herein, that apply bias arrangements in parallel or simultaneously to a plurality of memory cells, such as to multiple memory cells coupled to a single bit line, to all the memory cells in a sub-block, to all the memory cells in a block, to all the memory cells in multiple sub-blocks, or to all the memory cells in multiple blocks.

Furthermore, FIGS. 6-16 are examples and flow charts illustrating logic executed by a memory controller or by a memory device. The logic can be implemented using processors programmed using computer programs stored in memory accessible to the computer systems and executable by the processors, by dedicated logic hardware, including field programmable integrated circuits, and by combinations of dedicated logic hardware and computer programs. With all flow charts herein, it will be appreciated that many of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the technology disclosed, and it will be understood that numerous additional steps for accomplishing other functions can be performed before, after and between those shown.

Figure 6:
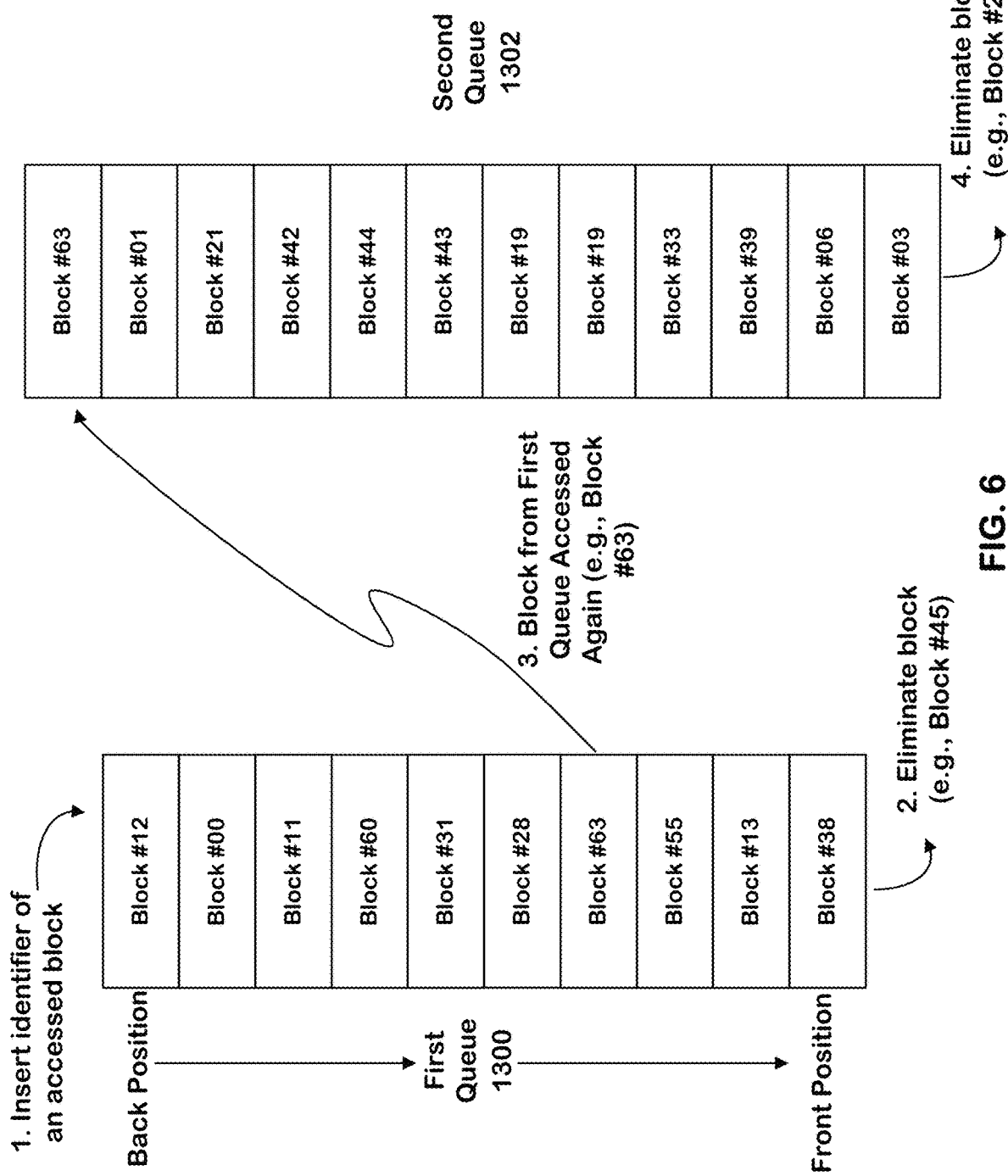
FIG. 6 illustrates the use of first and second queues for identifying read setup candidate blocks of a flash memory, according to an embodiment of the technology disclosed.

FIG. 6 illustrates the use of first and second queues for identifying read setup candidate blocks of a 3D flash memory, according to an embodiment of the technology disclosed.

Specifically, FIG. 6 illustrates a first queue 1300, which can be a first-in first-out (FIFO) queue 1300 and a second queue 1302, which can be a least recently used (LRU) queue 1302. The first and second queues 1300, 1302 can be other types of queues, such as a circular queue, a priority queue or a double-ended queue. The first and second queues 1300, 1302 can be implemented using a linked list using linked list pointers to point to positions in the linked list.

As illustrated, the first and second queues 1300, 1302 include a plurality of positions, including a front (frontmost) position, middle positions, and a back (backmost) position. FIG. 6 illustrates the second queue 1302 having more positions than the first queue 1300 (e.g., the second queue 1302 is of a bigger "size" than the first queue 1300). This is only an example. The first queue 1300 can have the same number of positions as the second queue 1302 (e.g., the first and second queues 1300, 1302 can be the same "size") or it can have more positions than the second queue 1302 (e.g., the first queue 1300 can be of a bigger "size" than the second queue 1302).

The positions in the first queue 1300 are used to identify blocks of the flash memory that have been accessed (e.g. read operation). As new blocks of the flash memory are accessed, their identifiers (e.g., block #12) are added the back position of the first queue 1300 (see item 1 of FIG. 6). In order to make room for the new identifier, the other identifiers are shifted towards the front of the first queue 1300. In this example, the identifier of block #12 is newly added to the back position of the first queue 1300 as a result of block #12 being accessed, causing the other identifiers to be shifted towards the front of the first queue 1300. If the positions in the first queue 1300 are full, then an identifier of a block of memory will be eliminated as a result of the shift (e.g., the identifier of block #45 is eliminated from the first queue 1300; see item 2 of FIG. 6). As an alternative to the example described above, the first queue 1300 can be implemented as a linked list and linked list pointers can be updated to achieve the same result.

Before an identifier of a block of flash memory is added to the first queue 1300, the technology disclosed checks to see if there is an identifier of the block of flash memory already included in the first queue 1300 or the second queue 1302. If there is not an identifier of the particular block of flash memory included in the first queue 1300 and there is not an identifier of the particular block of flash memory included in the second queue 1302, then the identifier of the particular block (e.g., block #12) can be added to the backmost position of the first queue 1300.

If a particular block of flash memory that is accessed is already identified in the first queue 1300 (e.g., block #63) (and not already identified in the second queue 1302), then an identifier of the particular block (e.g., block #63) is added to a backmost position of the second queue 1302 (see item 3 of FIG. 6). As discussed above regarding the first queue 1300, in order to make room for the identifier to be newly added to the second queue 1302, identifiers of other blocks included in the second queue 1302 are shifted towards the front of the second queue 1302. If the positions in the second queue 1302 are full, then an identifier of a block of memory will be eliminated as a result of the shift (see item 4 of FIG. 6). For example, as illustrated in FIG. 6, block #27 is eliminated from the second queue 1302 as a result of the shifting and adding of the identifier of block #63. The identifier of the accessed block that was newly added to the second queue 1302 can be removed from the first queue 1300. For example, as illustrated in FIG. 6, the identifier of block #63 can be removed from the first queue 1300 making space for a new identifier of a block and also preventing a block from being identified more than once in the first and second queues 1300, 1302. In this example, blocks #12, #00, #11, #60, #31 and #28 can be shifted towards the front of the first queue 1300 as a result of block #63 being removed. As an alternative to the example described above, the first and/or second queues 1300, 1302 can be implemented as a linked list and linked list pointers can be updated to achieve the same result.

Figure 7:
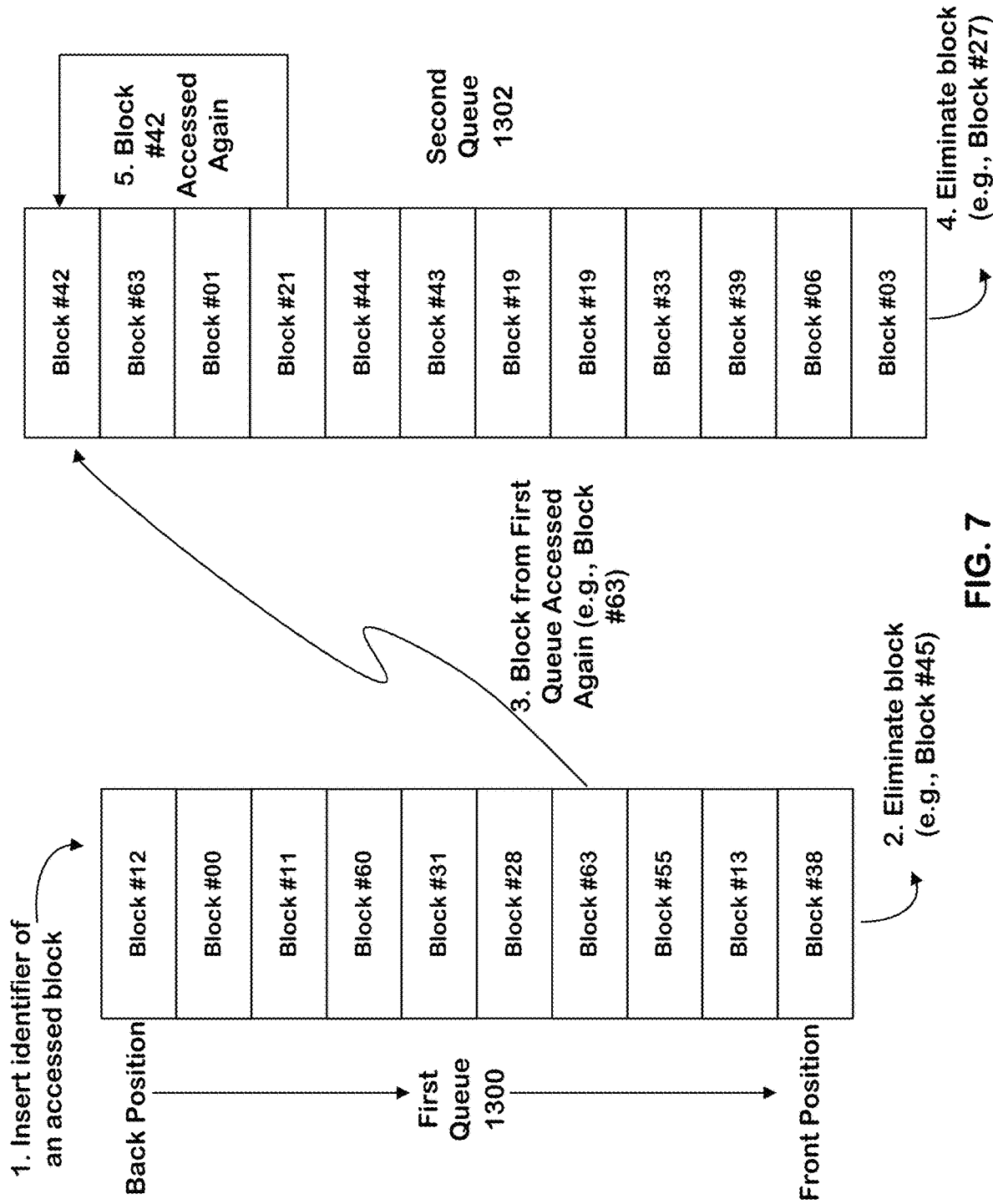
FIG. 7 illustrates the use of first and second queues for identifying read setup candidate blocks of a flash memory, according to an embodiment of the technology disclosed.

FIG. 7 illustrates the use of first and second queues for identifying read setup candidate blocks of a flash memory, according to an embodiment of the technology disclosed.

FIG. 7 is similar to FIG. 6, except that it provides an example of an identifier of an accessed block of flash memory not being included in the first queue 1300, but already being included in the second queue 1302. As a result, the identifier included in the second queue 1302 can be moved to a backmost position of the second queue 1302 if it is not already located at the backmost position (see item 5 of FIG. 7). For example, as illustrated in FIG. 7, if block #42 is accessed and it is not identified in the first queue 1300, but it is identified in a non-backmost position the second queue 1302, then the identifier of block #42 is moved to the backmost position of the second queue 1302. In this example, the identifiers of blocks #63, #01 and #21 will be shifted towards the front of the second queue 1302 as a result of the identifier of block #42 being moved to the back of the second queue 1302. As an alternative to the example described above, the first and/or second queues 1300, 1302 can be implemented as a linked list and linked list pointers can be updated to achieve the same result.

Figure 8:
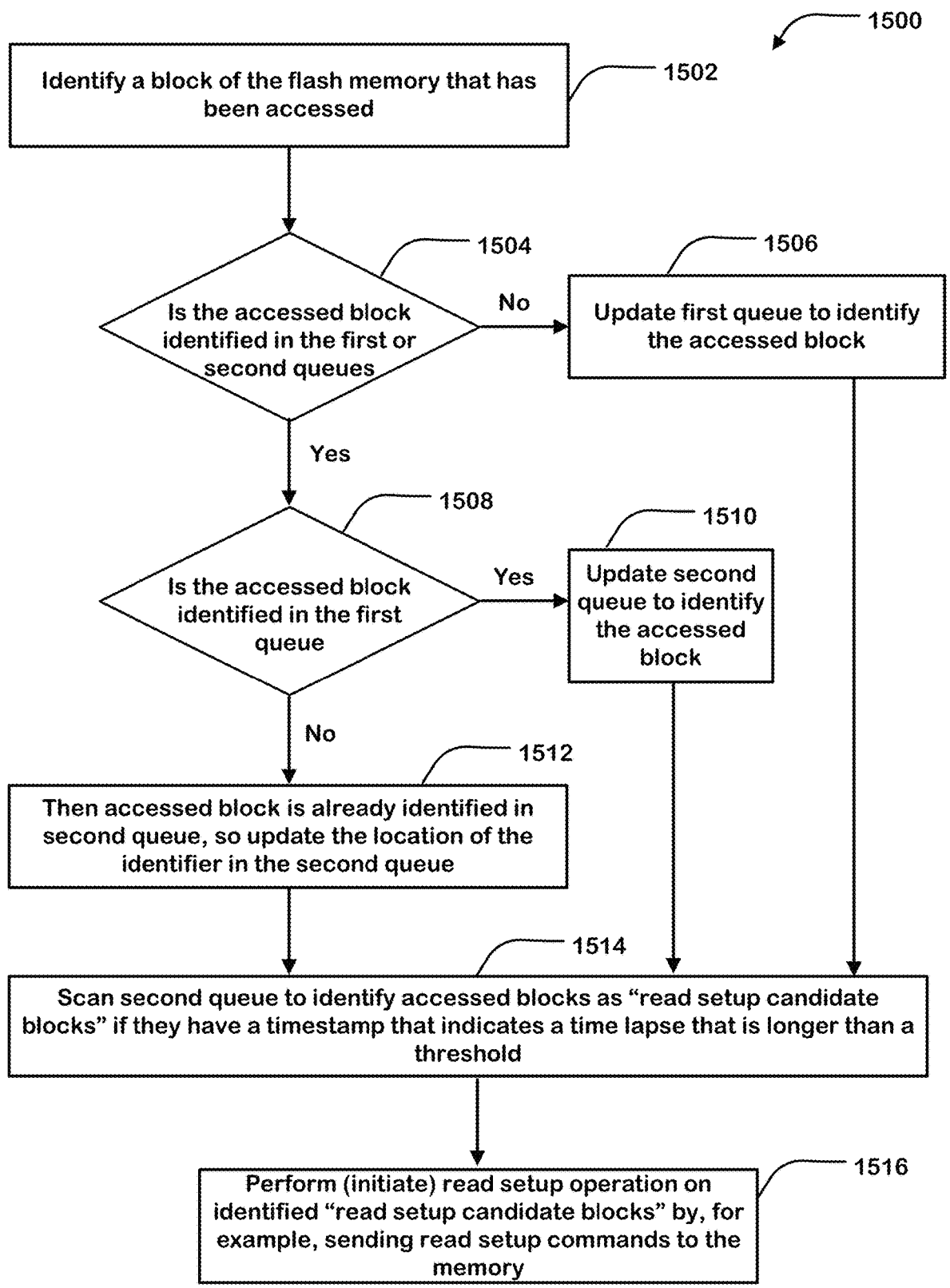
FIG. 8 illustrates a flow chart describing identifying read candidate blocks of a flash memory and performing a read setup operations on the identified read candidate blocks, according to an embodiment of the technology disclosed.

FIG. 8 illustrates a flow chart describing identifying read candidate blocks of a flash memory and performing read setup operations on the identified read candidate blocks, according to an embodiment of the technology disclosed.

Specifically, FIG. 8 is a flow chart 1500 for a representative method of operating a NAND flash memory including a plurality of blocks of memory cells arranged in NAND strings, each block including a distinct set of NAND strings. As described above, each block can include a plurality of sub-blocks, each sub-block including a distinct subset of NAND strings.

In FIG. 8, operation 1502 identifies a block of flash memory that is accessed. In response to the access (e.g., the identification of the access) of the block of memory, operation 1504 determines whether the accessed block of memory is identified in the first queue 1300 or the second queue 1302. If the accessed block of memory is not identified the first or second queues 1300, 1302, then operation 1506 updates the first queue 1300 to identify the accessed block, as discussed above with reference to FIGS. 6 and 7.

If the accessed block of memory is identified in either of the first or second queues 1300, 1302 (yes, in operation 1504), then operation 1508 determines whether the accessed block of flash memory is specifically identified in the first queue 1300. If the accessed block is determined to be identified in the first queue 1300 (yes, in operation 1508), then operation 1510 updates the second queue 1302 to identify the accessed block. As discussed with reference to FIGS. 6 and 7, the identifier of the accessed block can be removed from the first queue 1300, as it has been added to the second queue 1302. Furthermore, as discussed above, when identifiers are added to the queues in operations 1506 and 1510, the existing identifiers in the queues can be shifted towards the front of the queues.

If it is determined at operation 1508 that the accessed block is not identified in the first queue 1300, then operation 1512 determines that the accessed block should be included in the second queue 1302 and then updates the location (position) of the identifier of the accessed block in the second queue 1302, as discussed above with reference to FIGS. 13 and 7 (e.g., the position of the identifier is moved to the back of the second queue 1302 and other identifiers can be shifted towards the front of the second queue 1302).

Next, operation 1514 scans the second queue 1302 to identify any accessed blocks that qualify as read setup candidate blocks (also referred to as candidate read setup blocks). A block can be identified as a read setup candidate block if it has been identified as being present in the second queue 1302 longer than (or equal to) a predetermined threshold. A determination of whether a block has been present in the second queue 1302 longer than (or equal to) the predetermined threshold can be made using a timestamp or a time counter associated with the block in the second queue 1302. If the timestamp or time counter indicates that there has been a time lapse that is longer than (or equal to) the predetermined threshold, then the block has been present in the second queue 1302 longer than (or equal to) the predetermined threshold. The predetermined threshold for identifying read setup candidate blocks can be set to reflect any amount of time. In an example, the predetermined threshold can be set to 9 minutes, such that if the accessed block has been identified in the second queue 1302 for more than 9 minutes, then the accessed block will be identified as a read setup candidate block. The timestamp or time counter of the identified and accessed block can be set to zero when the block is first identified in the second queue 1302 or when it is moved to a backmost position in the second queue 1302 (as discussed below, the timestamp or time counter can be updated each time a scanning procedure is performed). The timestamp or time counter can be set relative to a time at which a block has been assessed and/or identified on the first and/or second queues 1300, 1302. For example, the timestamp or time counter of the identified and accessed block can be set to reflect a time (e.g., system clock time) at which the accessed block is identified in the first queue 1300 or it can be set to reflect a time (e.g., system clock time) at which the accessed block is initially identified in the second queue 1302 (e.g., when the identifier of the accessed block is moved from the first queue 1300 to the second queue 1302). The timestamp or time counter of the accessed block can also be set to reflect a time at which the location (position) of the identifier of the accessed block is moved to the back of the second queue 1302, as discussed above with reference to operation 1512. Other techniques for setting and/or changing the timestamp or time counter, such as those described below with reference to FIGS. 10 and 11, can be implemented. As an alternative to moving the positions of the identifiers of the blocks in the first and/or second queues 1300, 1302 and as an alternative to updating linked list pointers as discussed above, the timestamps or time counters can be updated in first and/or second queues 1300, 1302 in response use of or access to the particular blocks.

Once the read setup candidate blocks have been identified, operation 1516 performs a read setup operation on the read setup candidate blocks. The read setup operation can be performed according to any of the techniques described herein. In an embodiment, the read setup operation may not be performed on all of the read setup candidate blocks, as other qualifications for performing the read setup operation on blocks may be considered. In an embodiment, the read setup operation is performed only on a portion of block, such as a particular page of the block. The page of the block can be identified using the same techniques described above or the page of the block can be identified in the identifier of the block itself as the block is identified in the first and second queues 1300 and 1302. Accordingly, the read setup operations can be performed on a page-by-page basis. Therefore, a read setup operation being performed on an identified block can include performing the read setup operation on a page of the block, on multiple pages of the block or on all pages of the block. These techniques for performing the read operation on a portion of a block (e.g., a page of a block) can be implemented by all other read setup operation techniques described herein.

Figure 9:
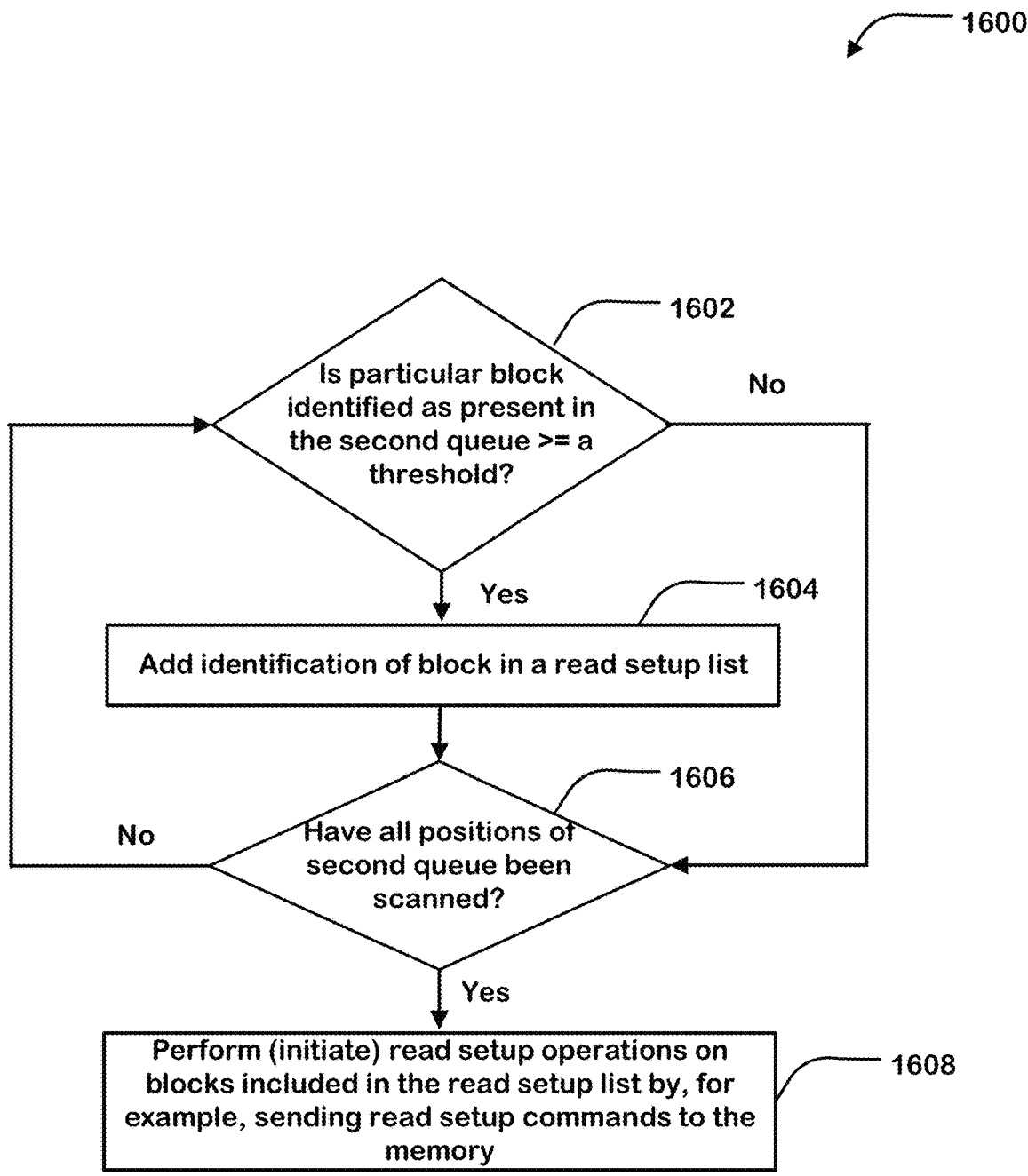
FIG. 9 illustrates a flow chart describing scanning a second queue to identify read setup candidate blocks of a flash memory and performing read setup operations on the identified read setup candidate blocks, according to an embodiment of the technology disclosed.

FIG. 9 illustrates a flow chart describing scanning a second queue to identify read setup candidate blocks of a flash memory and performing read setup operations on the identified read setup candidate blocks, according to an embodiment of the technology disclosed.

Specifically, FIG. 9 illustrates a flow chart 1600 that describes the scanning operation 1514 of FIG. 8 in more detail. The second queue 1302 can be periodically scanned according to a predetermined time interval. The predetermined time interval can be set to any time. An example time interval can be 1 minute. The second queue 1302 can be scanned starting from the frontmost position and ending at the backmost position, or in any other order. Each time a scan is performed, every position in the second queue 1302 can be scanned.

At operation 1602, during the scanning a determination is made as to whether a time lapse of a particular block identified in the second queue 1302 is greater than (or equal to) the predetermined threshold (e.g., has a particular block been identified as being present in the second queue 1302 longer than a predetermined threshold). If the time lapse for that particular block is greater than (or equal to) the predetermined threshold, then operation 1604 can add an identifier of the particular block to a read setup list in operation 1604. Next, operation 1606 determines whether all positions of the second queue 1302 have been scanned. If they have not been scanned (no, at operation 1606), then operation 1602 checks the time lapse of another block identified in the second queue 1302.

If, on the other hand, operation 1602 determines that the time laps does not exceed (or equal) the predetermined threshold, then the identifier of the particular block is not added to the read setup list and operation 1606 checks to see if all positions of the second queue 1302 have been scanned. As illustrated, once all positions of the second queue 1302 have been scanned (i.e., yes in operation 1606), then operation 1608 performs the read setup operations on the blocks of the memory that are included in the read setup list by, for example, sending read setup commands to the memory. Further, for example, operation 1608 can send read setup commands from a host (e.g., a memory controller) to the memory 2308, such that the read setup commands are received by command decoder/control circuits 2334 of the memory 2308, then scheduled by a state machine of the memory 2308 and then executed on the memory 2308. After the read setup operations have been initiated and/or completed the read setup list can be cleared, so that it can be repopulated the next time the second queue 1302 is scanned (e.g., once the predetermined time increment has expired and it is time for the scanning operations to begin again).

Figure 10:
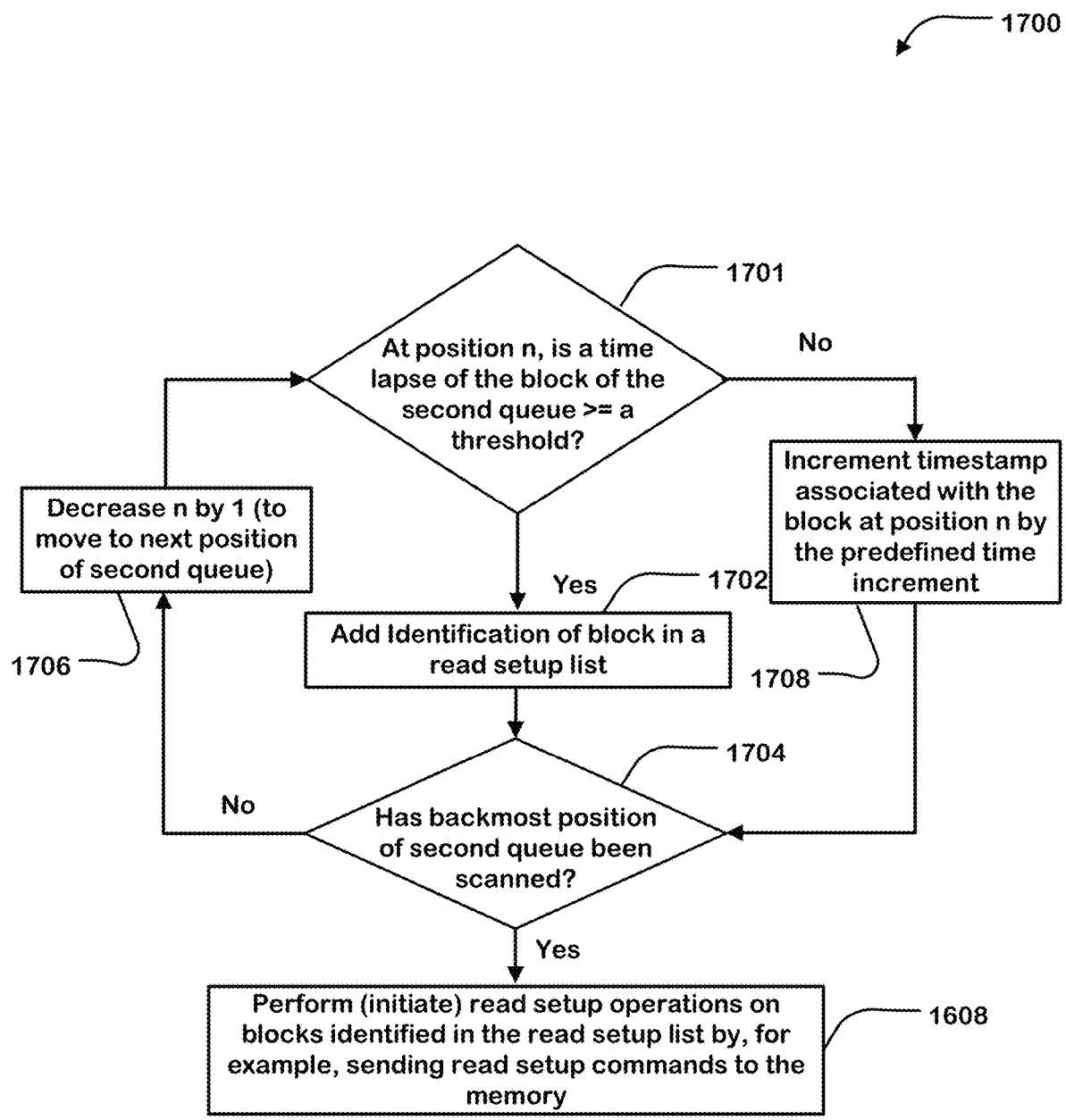
FIG. 10 illustrates a flow chart describing scanning a second queue to identify read setup candidate blocks of a flash memory and performing read setup operations on the identified read setup candidate blocks, according to an embodiment of the technology disclosed.

FIG. 10 illustrates a flow chart describing scanning a second queue to identify read setup candidate blocks of a flash memory and performing read setup operations on the identified read setup candidate blocks, according to an embodiment of the technology disclosed.

Specifically, FIG. 10 illustrates a flow chart 1700 that is similar to the flow chart 1600 of FIG. 9, except that further detail is provided regarding the order of the scanning and the incrementing of the timestamps.

At operation 1701, the scanning starts at position n of the second queue 1302. As discussed above, the scanning can start at a frontmost position, a backmost position or any other position of the second queue 1302. In this example, the scanning at operation 1701 will begin at the frontmost position of the second queue 1302, where n represents the number of positions in the second queue 1302. For example, if the second queue 1302 includes 12 positions for identifying different blocks of the memory, then n could initially equal 11 in operation 1701. This could be done in the reverse order, where n could start at 0 and increment up to 11 if there are 12 positions in the second queue 1302.

At operation 1701, a determination is made as to whether the time lapse for the block identified at position n (e.g., position 12, where n equals 11) is greater than (or equal to) the predetermined threshold.

In an embodiment, if the time lapse is not greater (or equal to) the predetermined threshold, then operation 1708 can increment the timestamp or time counter associated with the identifier of the block. In this particular embodiment, the timestamp or time counter associated with the block would initially be set to, for example 0 when the identifier of the block is added to the second queue 1302. Then, when the operation 1708 is performed, the timestamp or time counter will be incremented by the same time that the scanning is set to repeat. For example, if the scanning is set to repeat every 1 minute, then each time the scanning is performed and the identified block is still below the predetermined threshold, the timestamp or time counter will be incremented by 1 minute. Eventually, the timestamp or time counter associated with that particular block will be sufficiently incremented so that it equals or is greater than the predetermined threshold.

In another embodiment, operation 1708 can be omitted when the timestamp or time counter associated with the particular block is based on the system clock time at which the identifier of the particular block was added to, for example, the second queue 1302 (or the time at which the identifier was added to the first queue 1300 or the time at which the identifier was moved to the front of the second queue 1302 from another position in the second queue 1302). In this embodiment, there is no need for operation 1708, because the timestamp or time counter associated with the identifier of the particular block can be compared to the current system clock time to determine whether or not sufficient time has passed to meet or exceed the predetermined threshold. In this embodiment, operation 1708 is omitted, such that if operation 1701 results in "no," then operation 1704 is performed to determine whether or not the backmost position of the second queue 1302 has been scanned. In an embodiment, the second queue 1302 is scanned starting from the frontmost position and ending with the backmost position, as described above. Therefore, if the backmost position has been scanned, then all of the positions will have been scanned. In another embodiment where, perhaps, the scanning starts at the backmost position heading towards the frontmost position, operation 1704 will determine whether the frontmost position has been scanned. Furthermore, in another embodiment, operation 1704 can simply determine whether or not all of the positions in the second queue 1302 have been scanned.

Moving back to the description of operation 1701, if the time lapse is greater than (or equal to) the predetermined threshold, then operation 1702 will add the identifier of the particular block that is in position n of the second queue 1302 to a read setup list. Once the identifier is added to the read setup list, operation 1704 determines whether the backmost position of the second queue 1302 has been scanned (i.e., whether all of the positions have been scanned).

If the backmost position has not yet been scanned, the value of n is decremented by one in operation 1706 so that operation 1701 can be performed on the next block in the second queue 1302. Note that in another embodiment, operation 1706 could increment the value of n, in a situation where, for example, n starts with a value of 0. This cycle will continue until all of the positions have been scanned.

Once all of the positions have been scanned (i.e., yes in operation 1704), operation 1608 performs read setup operations on blocks that are identified in the read setup list. After the read setup operations are performed, the read setup list can be cleared out so that the next time the scanning is performed at the predetermined time the read setup list will be empty.

Figure 11:
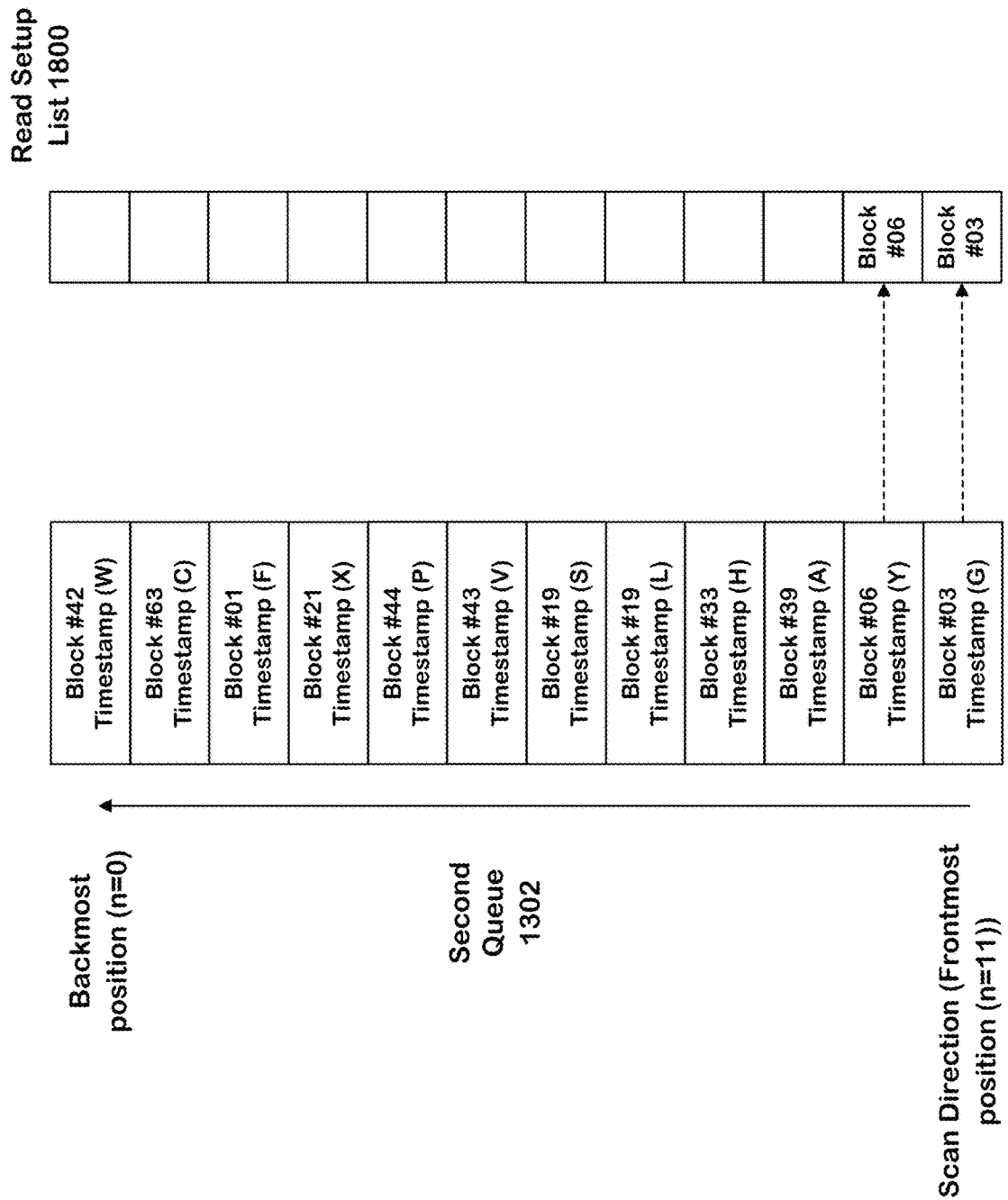
FIG. 11 illustrates the use of a read setup list for performing read setup operations, according to an embodiment of the technology disclosed.

FIG. 11 illustrates the use of a read setup list for performing read setup operations, according to an embodiment of the technology disclosed.

Specifically, FIG. 11 illustrates how a read setup list 1800 is populated from the second queue 1302. As illustrated, the second queue 1302 includes, for example, 12 positions at which various blocks are identified. As discussed above with reference to FIG. 10, the scanning of the second queue 1302 can begin at the frontmost position (e.g., n=11) and end at the backmost position (n=0), such that each time n is decremented the next position closer to the backmost position of the second queue 1302 is scanned. Once the scanning reaches the backmost position, that particular scanning operation is complete and scanning will resume again at the predetermined time increment (e.g., 1 minute).

Furthermore, as illustrated in FIG. 11, each position of the second queue 1302 includes an identifier of a particular block (e.g., block #06) and a corresponding timestamp or time counter (e.g., timestamp (Y)). As discussed above, the timestamps can be utilized in different ways. For example, the timestamp can start at 0 and each time the scanning is performed, the timestamp or time counter can be incremented by some value (e.g., by the predetermined time increment according to which the scanning is performed). Alternatively, the timestamp or time counter can be the time of the system clock at which the identifier of the particular block was added the second queue 1302 or the first queue 1300. If this alternate approach is used, there is no need for operation 1708, as discussed above with reference to FIG. 10.

As the scanning is performed, if a particular timestamp or time counter (e.g., timestamp (Y)) associated with a particular block (e.g., block #06) is greater than (or equal to) the predetermined threshold, then an identifier of that particular block is added to the read setup list 1800. FIG. 11 illustrates two timestamps or time counters exceeding the predetermined threshold, such that identifiers of blocks #06 and #03 are added to the read setup list 1800.

The read setup list 1800 can be formed so as to have the same number of positions as the second queue 1302, such that there can be one-to-one mapping from the positions in the second queue 1302 to the positions in the read setup list 1800. Other types of read setup lists can be used that do not have a one-to-one mapping to the second queue 1302. Once the scanning iteration is complete, the read setup operations are performed on the blocks that are identified in the read setup list 1800. As mentioned above with respect to FIG. 10, the read setup list 1800 can be cleared out after the read setup operations have been performed, so that it is empty when the next scanning operation begins. The read setup operations can be started from the frontmost position or the backmost position of the read setup list 1800, or in any other order or at the same time.

Figure 12:
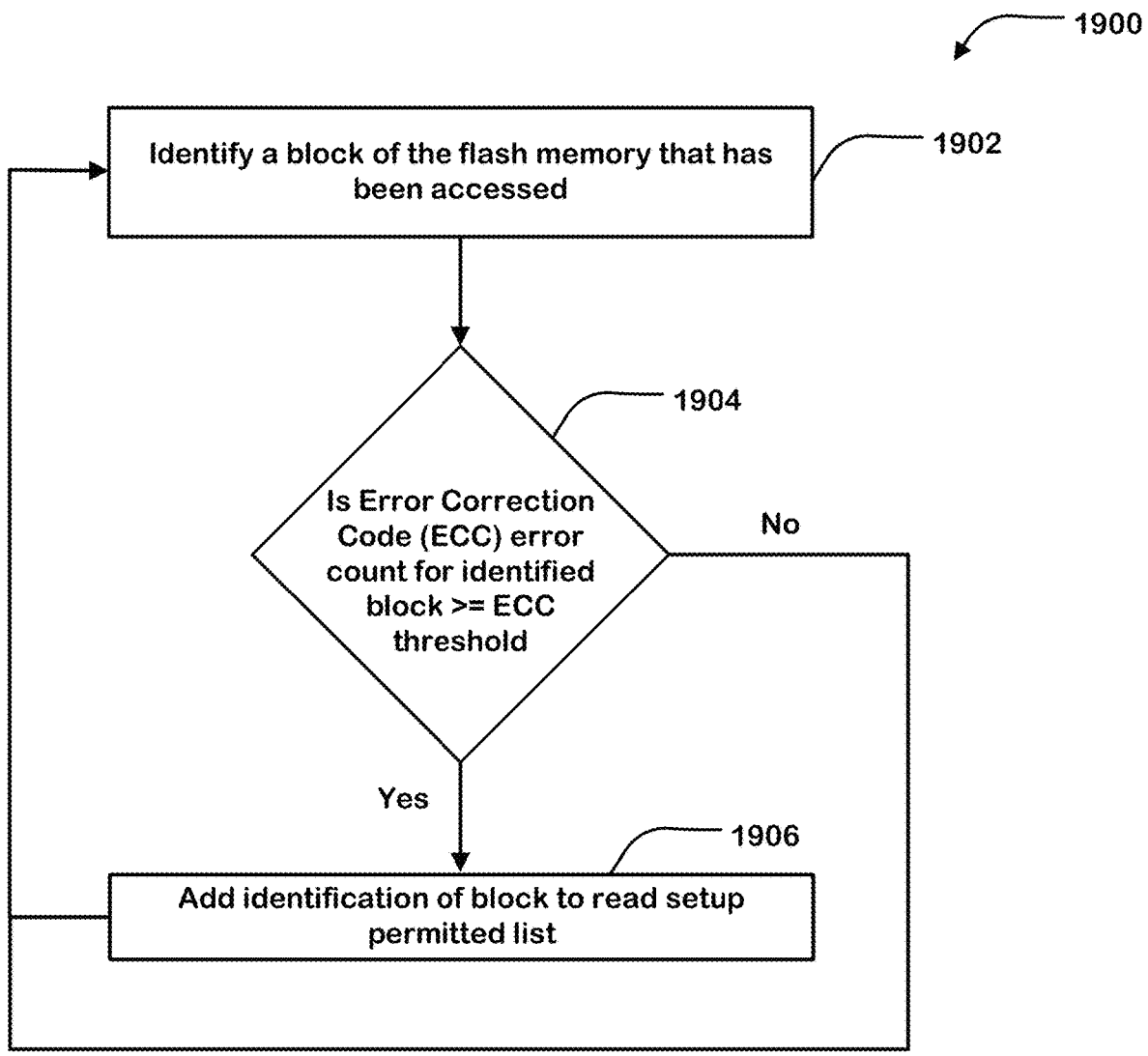
FIG. 12 illustrates a flow chart describing the use of an error correction code (ECC) for identifying read setup candidate blocks, according to an embodiment of the technology disclosed.

FIG. 12 illustrates a flow chart describing the use of an error correction code (ECC) for identifying read setup candidate blocks, according to an embodiment of the technology disclosed.

In the early lifetime of blocks of memory, there may not be a need to perform the read setup operations because the rate at which the threshold voltages deviate over time is not yet undesirable. Therefore, in an embodiment of the technology disclosed, the read setup operations will only be performed on blocks have been sufficiently used.

FIG. 12 illustrates a flow chart 1900 that describes the implementation of using an error correction code (ECC) to identify an ECC error count for determining whether particular blocks have been sufficiently used before implementing the various techniques for performing the read setup operations. Operation 1902 identifies a block of the flash memory that has been accessed. Operation 1904 determines, for the particular block, whether a number of errors error has been detected, using the ECC, that is great than (or equal to) an ECC threshold. A persistent non-volatile list can be used to keep track of the number of errors detected for the blocks of the memory, such that the contents of the list remain after the loss of power. Each time an error occurs, an ECC error count for the particular block can be increased in the list. This list can be used when determining the number of errors for the block identified in operation 1902 is greater than (or equal to) the ECC threshold. Alternatively, the number of errors for a particular read operation can be tracked, such that if the number of errors detected using ECC exceeds the ECC threshold, then the particular block that is the subject of the read operation can be identified in a list.

If the number of errors (e.g., the ECC error count) is greater than (or equal to) the ECC threshold, then operation 1906 adds an identifier of the particular block to a read setup permitted list and then operation 1902 will be performed to identify another block. If the ECC error count is not greater than (or equal to) the ECC threshold (i.e., no at operation 1904) the identifier of the particular block is not added to the read setup permitted list and operation 1902 will be performed to identify another block. Further, if operation 1904 determines that the ECC error count is great than (or equal to) the ECC threshold for a particular block, then the block can be identified in the first or second queues 1300, 1302 or it can be identified in the read setup list (i.e., identified as a read setup candidate) regardless of whether the particular block of memory has been identified as present in the second queue 1302 longer than the predetermined threshold or regardless of whether the particular block of memory has been identified in any of the first and/or second queues 1300, 1302.

Using the ECC error count is only one way of determining whether a particular block of memory has been sufficiently used in order to be a read setup candidate. Other types of usage can be considered, such as the number of program and erase (PE) cycles of the particular block. Similar to what is describe above regarding the ECC error count, a list can be maintained the keeps track of the number of PE cycles for each block. If the number of PE cycles are greater than (or equal to) a particular PE threshold for a particular block, then an identifier of the block will be added to the read setup permitted list. Other techniques for determining whether a particular block of memory has been sufficiently used can also be implemented along with the ECC error count and/or the PE cycle count, or on their own.

In an embodiment of the technology disclosed, the read setup operations can be performed on blocks that are identified in the setup permitted list without using the techniques described above that use the first and second queues 1300, 1302. Or, as described below with reference to FIG. 13, the read setup permitted list can be integrated into the operations that utilize the first and second queues 1300, 1302 to determine which blocks are candidates for the read setup operations.

Figure 13:
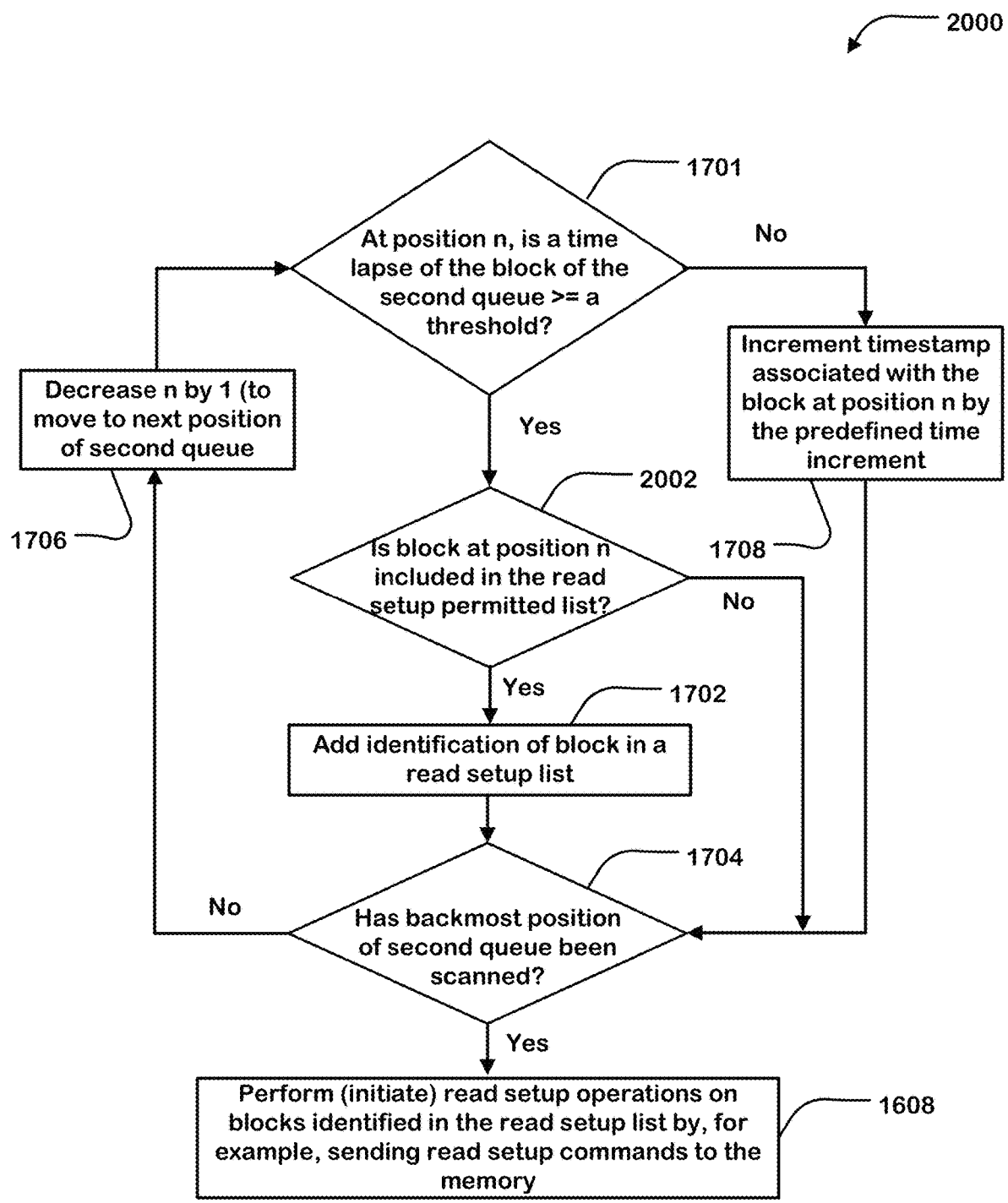
FIG. 13 illustrates a flow chart that describes identifying read candidate blocks of a flash memory using a read setup permitted list and performing read setup operations on the identified read candidate blocks, according to an embodiment of the technology disclosed.

FIG. 13 illustrates a flow chart that describes identifying read candidate blocks of a flash memory using a read setup permitted list and performing a read setup operations on the identified read candidate blocks, according to an embodiment of the technology disclosed.

Specifically, FIG. 13 illustrates a flow chart 2000 that is similar to the flow chart 1600 of FIG. 9. Each of operations 1701, 1702, 1704, 1706, 1708 and 1608 of flow chart 2000 are the same as described above with reference to FIG. 9. As such, redundant descriptions thereof are omitted.

Operation 2002 of FIG. 13 determines whether the block identified at position n is included in the read setup permitted list. Operations 1904 and 1906 of FIG. 12 describe adding a particular block to the read setup permitted list based on the usage of the block. If the block is identified in the read setup permitted list, then operation 1702 will add an identifier of the block to the read setup list. If the block is not identified in the read setup permitted list, operation 1704 will check to see if block n is as the backmost position of the second queue. The operations described in FIG. 13 can be performed after the operations of FIG. 12. As discussed with reference to FIG. 12, the blocks can be identified in the read setup permitted list based on their usage, such as ECC error count, PE count, etc.

Figure 14:
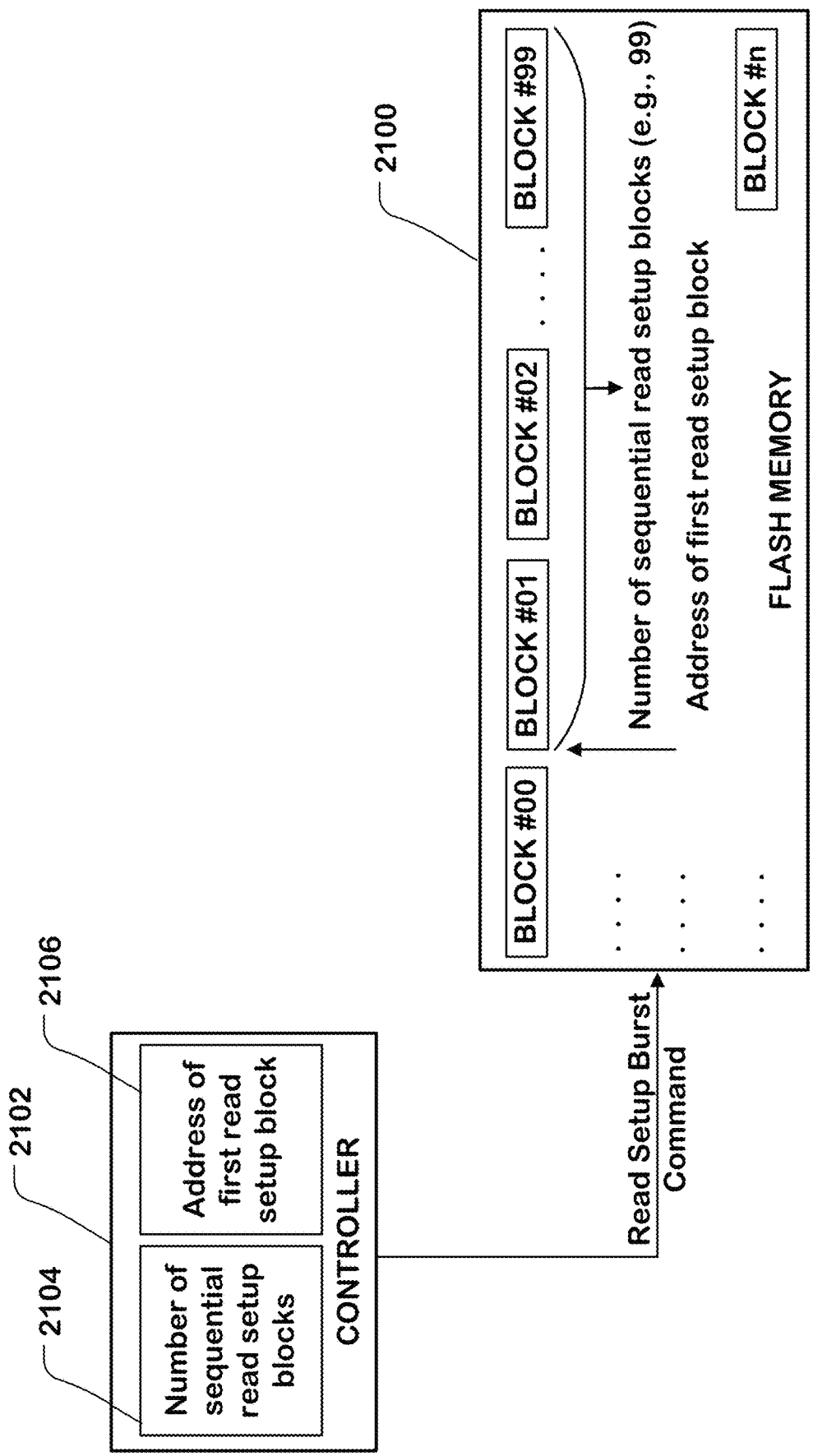
FIG. 14 is a simplified diagram of a controller sending a read setup burst command to a flash memory, according to an embodiment of the technology disclosed.

FIG. 14 is a simplified diagram of a controller sending a read setup burst command to a flash memory, according to an embodiment of the technology disclosed.

Specifically, FIG. 14 illustrates a flash memory 2100 and a controller 2102. As illustrated, the flash memory 2100 includes several blocks, starting from block #00 and ending with block #n. Each block includes multiple pages, as discussed above.

The controller 2102 can identify or obtain information identifying a number of sequential read setup blocks 2104 and an address of a first read setup block 2106 of the sequence of sequential read setup blocks. The (sequential or non-sequential) read setup blocks can be identified as candidates for read setup operations using any of the techniques described herein, such as using the first and second queues 1300, 1302, etc. Furthermore, the read setup blocks can also be non-sequential blocks of the memory. The "number" of the sequential read setup blocks represents the actual number of blocks of the flash memory 2100 that are candidates for the read setup operations and that are in sequential order. Alternatively, the controller 2102 can identify the first and last blocks of the sequence of the sequential read setup blocks or it can identify addresses of the first and last blocks of the sequence of sequential read setup blocks.

The controller 2102 generates a read setup burst command that identifies (i) an address of a first block in a set of (sequential or non-sequential) read setup blocks and (ii) a number of read setup blocks, as candidates for read setup operations and then provides the generated read setup burst command to the flash memory 2100. The generated read setup burst command can include additional information, as described herein. Alternatively, the read setup burst command can identify the first and last blocks of a sequence of sequential read setup blocks or it can identify addresses of the first and last blocks of a sequence of sequential read setup blocks.

As illustrated in FIG. 14, the sequence of the identified sequential read setup blocks can include blocks #01 through #99 of the flash memory 2100. In this example, the read setup burst command received by the flash memory 2100 can identify an address of block #01, which is the first read setup block in the sequence of the sequential read setup blocks and it can also indicate that there are 99 blocks in the sequence of the sequential read setup blocks or that there are 99 blocks in the set of non-sequential read setup blocks.

In response to receiving the read setup burst command from the controller 2102 or in response to decoding the read setup burst command, the flash memory 2100 can then perform the read operations on a plurality of read setup blocks of the set of read setup blocks. The receiving and/or decoding of the read setup burst command initiates a read setup burst operation on the flash memory 2100 that includes performing the read operations on a plurality of read setup blocks of the set of read setup blocks.

The controller 2102 can be part of a host, as discussed in more detail with reference to FIG. 16, wherein the host can be part of the flash memory 2100 or separate from the flash memory 2100. The controller 2102 can also be separate from the host and it can be part of or separate from the flash memory 2100. The controller 2102 can identify and manage the identifying of the (sequential or non-sequential) read setup blocks using, for example, the first and second queues 1300, 1302 or it can receive information identifying the (sequential or non-sequential) read setup blocks from another device. A read setup list of candidate read setup blocks can be sent from the controller 2102 as part of the read setup burst command or separately from the read setup burst command. The read setup list can be received by the memory 2100 and the memory 2100 can store and maintain the read setup list. Further, the memory 2100 can utilize the read setup list to perform read setup operations on blocks identified in the read setup list. Additionally, blocks identified in the read setup list can include some or all of the blocks included in any list of blocks described herein, including the read setup list 1800. The memory 2100 can perform the read setup operations on the blocks identified in the read setup list.

Figure 15:
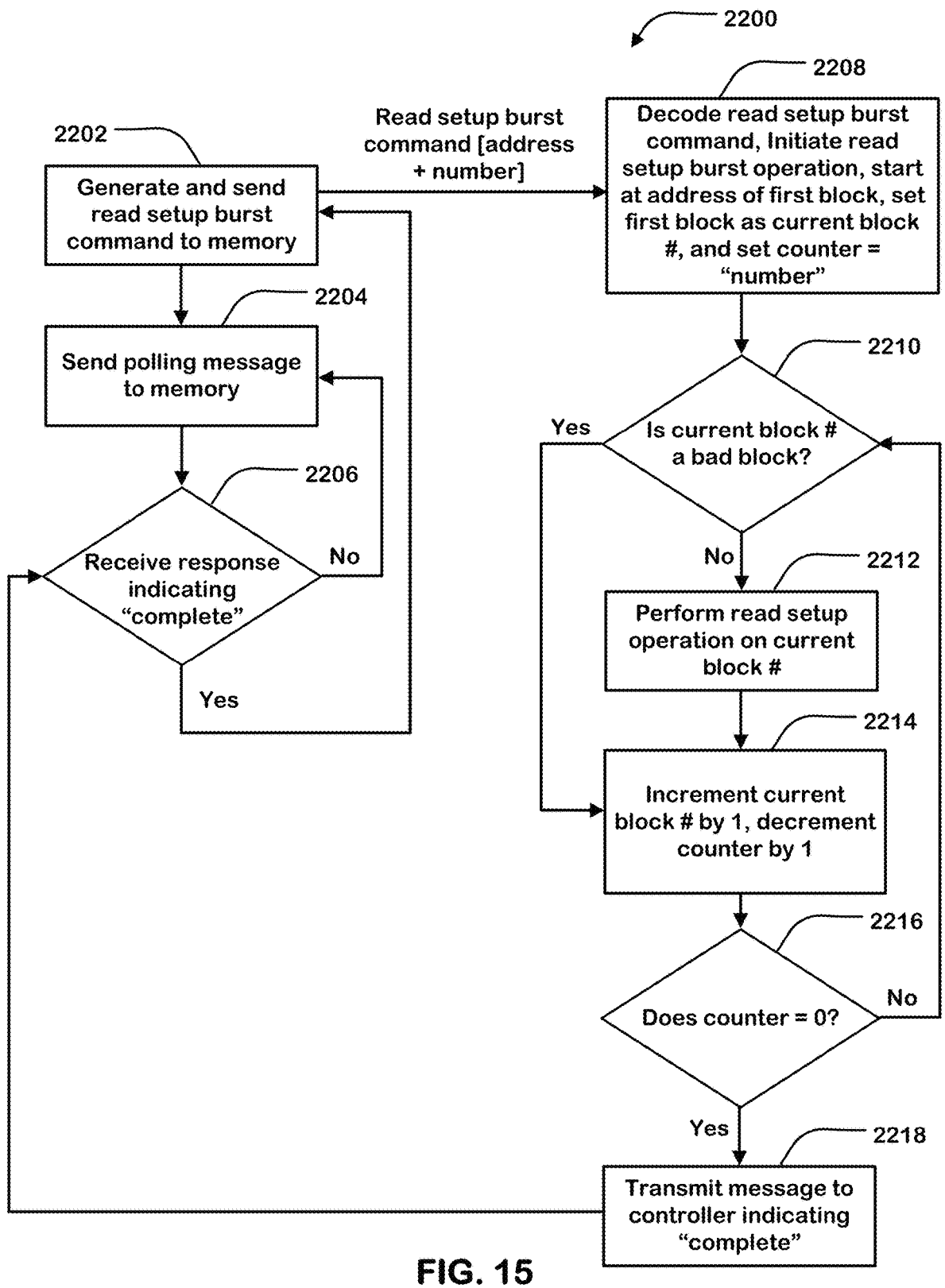
FIG. 15 illustrates a flow chart that describes generating a read setup burst command, sending the read setup burst command to a memory and the memory performing read setup operations according to the read setup burst command, according to an embodiment of the technology disclosed.

FIG. 15 illustrates a flow chart that describes generating a read setup burst command, sending the read setup burst command to a memory and the memory performing read setup operations according to the read setup burst command, according to an embodiment of the technology disclosed.

Specifically, FIG. 15 illustrates a flow chart 2200 that includes various operations performed by the controller 2102 and the flash memory 2100. In an embodiment, the operations on the left hand side of FIG. 15 (i.e., operations 2202, 2204 and 2206) can be performed by the controller 2102 and the operations on the right hand side of FIG. 15 (i.e., operations 2208, 2210, 2212, 2214, 2216 and 2218) can be performed by the flash memory 2100. However, the technology disclosed is not limited to the operations of FIG. 15 only being performed as described above. For example, all of the operations illustrated in FIG. 15 can be performed by components of the memory 2100 itself.

In operation 2202, the controller 2102 can generate and send the read setup burst command to the flash memory 2100. As discussed above with reference to FIG. 15, the read setup burst command identifies an address and a number.

After operation 2202 sends the read setup burst command, the controller 2102 can send a polling message to the flash memory 2100. The polling message can request information regarding a status of the read setup burst operation. The polling message can be sent after a predetermined amount/period of time has passed since the read setup burst command has been sent or it can be sent immediately after the read setup burst command has been sent. Alternatively, the polling message can be sent along with the read setup burst command.

Operation 2206 determines whether the controller 2102 has received a message from the flash memory 2100 indicating that the read setup burst operation is complete. If the message has not yet been received, operation 2204 can send another polling message to the flash memory 2100. If the message has been received from the flash memory 2100, then operation 2202 can generate and send another read setup burst command to the memory 2100. Operation 2204 is optional and the controller 2102 can just wait until the message indicating complete is received in operation 2206 before operation 2202 can be performed again. Alternatively, the controller 2102 can wait a predetermined amount of time before operation 2202 can be performed again.

In response to receiving the read setup burst command from the controller 2102, the flash memory 2100, operation 2208, can decode the read setup burst command, initiate the read setup burst operation starting at an address of the first block (or an address of a page of the first block). In an embodiment, operation 2208 can set a counter that is equal to the number identified in the read setup burst command and set a current block number to identify the first read setup block of the sequence of read setup blocks. For example, if the read setup burst command includes an address that identifies block #01, then the current block number identifies block #01 and if the read setup burst command identifies 99 blocks in the sequence of the read setup blocks, then the counter is set to 99.

Operation 2210, which is optional, determines whether or not the current block (identified by the current block number) is a bad block. In the example from above, operation 2210 would be performed on block #01, which was identified based on the address included in the read setup burst command. Operation 2210 can identify a bad block from a list or using logic and/or circuitry. A block can be identified as a bad block based on its performance, amount of use or other factors. If the current block (identified by the current block number) is not a bad block, then operation 2212 performs a read setup operation on the current block. If the current block (identified by the current block number) is determined to be a bad block, then the read setup operation is not performed on that block (i.e., operation 2212 is skipped), such that operation 2214 moves on to the next block (e.g., increments the current block number by 1) and adjusts the counter (e.g., decrements the counter by 1).

Continuing from the example from above, operation 2210 determines whether block #01 is a bad block. If block #01 is not a bad block (i.e., it is a good block), then operation 2212 performs the read setup operation on block #01.

Operation 2214 increments the block number by 1, so as to identify block #02, which is the next block in the sequence of the read setup blocks, as the current block. Operation 2214 also decreases the counter by a value of 1, such that the counter equals 98. Operation 2214 may not increment the current block number if the current block number identifies the last block in the sequence of sequential blocks. One way to determine whether the current block number is the last block in the sequence of the sequential block is to use the value of the counter. For example, if at operation 2214 the counter has a value of 1 before being decremented in operation 2214 or if the counter has a value of 0 after being decremented, then it can be determined that the current block is the last block in the sequence of the sequential read setup blocks and the incrementing of the current block number can be omitted.

After the counter is decremented by 1, operation 2216 determines whether the counter equals 0. If the counter does not equal 0, then optional operation 2210 and/or operation 2212 can be performed on the current block (note that the current block is now a different block, as the number identifying the current block has been updated in operation 2214). The counter can also start at a certain number that is below the number identified in the read setup burst command and increment up to the number identified in the read setup burst command.

From the example above, the current block number now identifies block #02 and the counter equals 98. Therefore, after operation 2216 determines that the counter does not equal 0, then operation 2210 will determine whether block #02 is a bad block. As discussed above, operation 2210 is optional. Therefore, if operation 2210 is omitted, then the determination that the counter does not equal 0 in operation 2214 can result in operation 2212 performing the read setup operation on block #02, which is now identified as the current block.

This loop of operations 2210, 2212, 2214 and 2216 will continue until the counter does equal 0 (i.e., all of the blocks in the sequence of read setup blocks have been considered. In the example from above, these operations will continue until the counter is decremented from 99 to 0, which will result in the read setup operations being performed on blocks #01 through #99, assuming that no bad blocks were identified in optional operation 2210. In response to the counter equaling 0, operation 2218 can transmit a message to the controller 2102 indicating that the read setup burst operation is complete. As discussed above, the message indicating "complete" can be used to allow the controller 2102 to perform operation 2202.

The read setup blocks can be sequential or non-sequential and can be identified using lists, such as the first and second queues 1300, 1302, etc. For example, a read setup list of candidate read setup blocks can be maintained and the set of read setup blocks can include read setup candidate blocks in the read setup list. A determination can be made as to whether any of the candidate read setup blocks are in sequential order as addressed in the memory. In response to the determination that there are candidate read setup blocks in sequential order, the candidate read setup blocks that are in the sequential order can be identified as the plurality of read setup blocks of the set of read setup blocks upon which the read setup burst operation is performed. Furthermore, the controller 2102 or the memory 2100 can identify a first set of candidate read setup blocks from the read setup list (where the first set includes two or more candidate read setup blocks that are in sequential order as addressed in the memory), identify a second set of candidate read setup blocks from the read setup list, (where the second set includes two or more candidate read setup blocks that are in sequential order as addressed in the memory, and the second set includes candidate read setup blocks that are different from the candidate read setup blocks included in the first set, determine that the second set of candidate read setup blocks includes more candidate read setup blocks than the first set of candidate read setup blocks, and identify the candidate read setup blocks from the second set as the plurality of read setup blocks of the set of read setup blocks upon which the read setup burst operation is performed.

Figure 16:
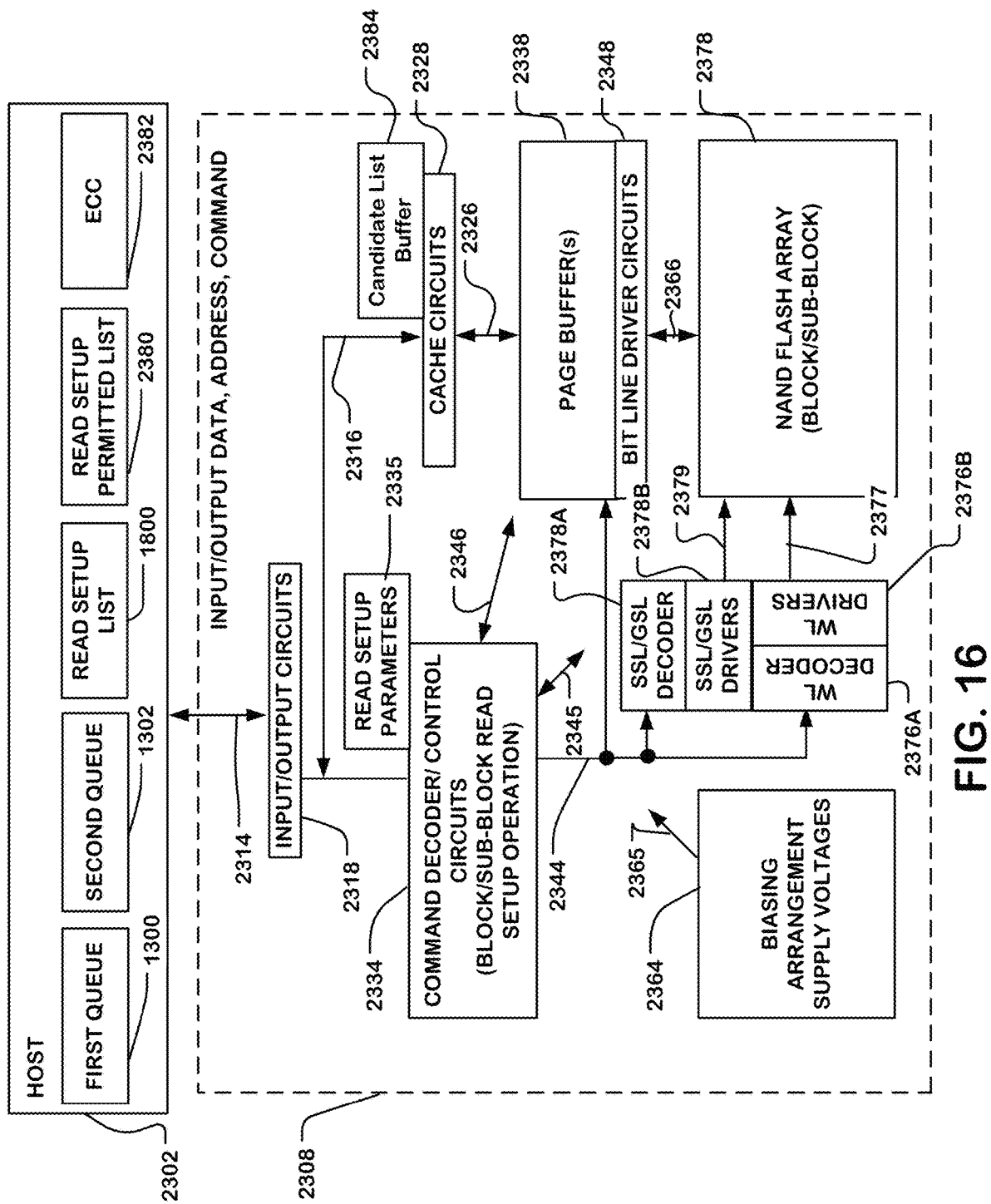
FIG. 16 is a block diagram of a memory system as described herein.

FIG. 16 is a simplified diagram of a memory system including a flash memory device 2308 implemented on an integrated circuit and a host 2302 including logic for issuing commands such as read commands, and program commands with addresses and data to be programmed. In some embodiments, the host can issue read setup commands and read setup burst commands to initiate read setup operations on the memory device 2308. The memory device 2308 can be implemented on a single integrated circuit chip, on a multichip module, or on a plurality of chips configured as suits a particular need.

The memory device 2308 in this example includes a memory array 2378 including a plurality of blocks as described above, each having a plurality of sub-blocks, on an integrated circuit substrate. The memory array 2378 can be a NAND flash memory implemented using two-dimensional or three-dimensional array technology.

In various embodiments, the memory device 2308 may have single-level cells (SLC), or multiple-level cells storing more than one bit per cell (e.g., MLC, TLC or XLC).

The memory device 2308 includes a memory array 2378, which can be a NAND flash memory implemented using three-dimensional array technology having one or multiple planes, each plane having multiple blocks, and each block having multiple sub-blocks.

A word line decoder 2376A is coupled via word line driver circuits 2376B to a plurality of word lines 2377 in the memory array 2378. SSL/GSL decoder 2378A is coupled via SSL/GSL driver circuits 2378B by SSL and GSL lines 2379, to bit line side (SSL) and common source side (GSL) string select gates in the array. Page buffer circuits 2338 are coupled by bit line driver circuits 2348 to bit lines 2366 in the memory array 2378. In some embodiments, column decoder circuits can be included for routing data from the bit line drivers to selected bit lines. The page buffer circuits 2338 can store pages of data that define a data pattern for a page program operation, and can include sensing circuits used in read and verify operations.

Bit lines for memory arrays can comprise global bit lines (GBL) and local bit lines. Bit lines generally comprise metal conductors in higher patterned layers that traverse a plurality of blocks of memory cells in an array. The global bit lines are connected to the NAND strings for current flow to and from the bit lines, which in turn are connected to the bit line driver circuits 2348 and page buffer circuits 2338. Likewise, the word lines can include global word lines and local word lines with corresponding supporting circuits 2376B in the word line drivers.

In a sensing operation, sensed data from the page buffer circuits 2338 are supplied via second data lines in bus system 2326 to cache circuits 2328, which are in turn coupled to input/output circuits 2318 via data path links 2316. Also, input data is applied in this example to the cache circuits 2328 on links 2316, and to the page buffer circuits 2338 on bus system 2326, for use in support of program operations. Additionally, the cache circuits 2328 can include a candidate list buffer 2384 that can store and maintain a read setup list of candidate read setup blocks. The read setup list can be received from the host 2302 along with the read setup burst command. Further, the memory 2308 can utilize the read setup list to perform read setup operations on blocks identified on the read setup list.

Input/output circuits 2318 are connected by link 2314 (including I/O pads) and provide communication paths for the data, addresses and commands with destinations external to the memory device 2308, including the host 2302 in this example. The input/output circuits 2318 provide a communication path by link 2316 to cache circuits 2328 which support memory operations. The cache circuits 2328 are in data flow communication (using for example a bus system 2326) with page buffer circuits 2338.

Control circuits 2334 are connected to the input/output circuits 2318, and include command decoder logic, address counters, state machines, timing circuits and other logic circuits that control various memory operations, including program, read, and erase operations for the memory array 2378. Control circuit signals are distributed to circuits in the memory device, as shown by arrows 2345, 2346, as required to support the operations of the circuits. The control circuits 2334 can include address registers and the like for delivery of addresses as necessary to the components of the memory device 2308, including delivery to the cache circuits 2328 and, on link 2344, to the page buffer circuits 2338, word line decoder 2376A and SSL/GSL decoder 2378A in this illustration.

In the example shown in FIG. 16, control circuits 2334 include control logic circuits that include modules implementing a bias arrangement state machine, or machines, which controls, or control, the application of bias voltages generated or provided through the voltage supply or supplies in block 2364, including read setup, read, erase, verify and program voltages including precharge voltages, pass voltages and other bias voltages as described herein to word line driver circuits 2376B and bit line driver circuits 2348, for a set of selectable program, read setup and read operations. Bias voltages are applied as represented by arrow 2365, to components of the memory device 2308, as necessary for support of the operations.

The control circuits 2334 can include modules implemented using special-purpose logic circuitry including state machines, as known in the art. In alternative embodiments, the control circuits 2334 can include modules implemented using a general-purpose processor, which can be implemented on the same integrated circuit, which execute a computer program to control the operations of the memory device 2308. In yet other embodiments, a combination of special-purpose logic circuitry and a general-purpose processor can be utilized for implementation of modules in control circuits 2334.

The flash memory array 2378 can comprise floating gate memory cells or dielectric charge trapping memory cells configured to store multiple bits per cell, by the establishment of multiple program levels that correspond to amounts of charge stored, which in turn establish memory cell threshold voltages Vt. The technology can be used with single-bit-per-cell flash memory, and with other multiple-bit-per-cell and single-bit-per-cell memory technologies. In other examples, the memory cells may comprise programmable resistance memory cells, phase change memory cells, and other types of non-volatile and volatile memory cell technologies.

In the illustrated example, the host 2302 is coupled to links 2314 on the memory device 2308, as well as other control terminals not shown, such as chip select terminals and so on, and can provide commands or instructions to the memory device 2308. In some examples, the host 2302 can be coupled to the memory device using a serial bus technology, using shared address and data lines. The host 2302 can comprise a general purpose processor, a special purpose processor, a processor configured as a memory controller, or other processor that uses the memory device 2308. All or part of the host 2302 can be implemented on the same integrated circuit as the memory. The memory controller can execute some or all of the processes described with reference to FIGS. 6-15. Further the host 2302 (e.g., the memory controller) can include an error correction code (ECC) circuit 2382. The ECC circuit 2382 can be used to carry out the operations discussed above with reference to, for example, FIG. 12. Specifically, for example, the ECC circuit 2382 can be used (using, e.g., ECC information) to identify blocks of memory for which a number of errors have been detected that is greater than (or equal to) the ECC threshold or the ECC circuit 2382 can be used to determine, for blocks of memory, whether a number of errors has been detected that is greater than (or equal to) an ECC threshold.

The host 2302 can update data stored in the memory based on requests from an application program. In general, the host 2302 can include programs that perform memory management functions including, in some embodiments, functions to control or support read setup operations as described herein. Other memory management functions can include, for example, managing the first and second queues, identifying read setup candidates, managing timestamps, managing the read setup list and the read setup permitted list, as well as managing information disclosed herewith related to the determination of the read setup candidate and operations associated therewith and so the read setup burst commands. Additional memory management functions can include wear leveling, bad block recovery, power loss recovery, garbage collection, error correction, and so on. Also, the host 2302 can include application programs, file systems, flash translation layer programs and other components that can produce status information for data stored in the memory, including issuing commands to program data having addresses and data to be programmed.

In the example illustrated in FIG. 16, the memory device includes a set of status registers 2335 to store parameters for read setup operations. The parameters can define the voltage levels to be applied, whether to turn on or off the string select and ground select gates, pulse durations and so on. Also, the parameters can include a starting plane and block address and a range of block addresses (or addresses of other read setup units) to be subject of a particular read setup operation. The parameters can include indicators for planes, and blocks within planes, and sub-blocks within blocks to be activated simultaneously for read setup operations. Some or all of parameters can be provided by read setup commands and/or read setup burst commands, and some or all can be stored as configuration data on the chip.

The host 2302 (e.g., the memory controller) can also include the first queue 1300, the second queue 1302, the read setup list 1800 and the read setup permitted list 2380. The host 2302 can implement the first queue 1300, the second queue 1302, the read setup list 1800 and the read setup permitted list 2380 in the various manners discussed herein. Alternatively, the memory device can include some or all of the first queue 1300, the second queue 1302, the read setup list 1800 and the read setup permitted list 2380 and the control circuits 2334, along with the read setup parameters 2335, can utilize some or all of the first queue 1300, the second queue 1302, the read setup list 1800 and the read setup permitted list 2380 to perform the read setup operations described herein.

A state machine on the memory device can access the read setup parameters, and execute a read setup operation including address generation and applying bias voltages to traverse the memory array to maintain read ready status across the memory. The operation can include a pattern of blocks in one plane or in multiple planes that can be subjected to the read setup operation simultaneously. The operation can be configured to traverse the array or parts of the array as a background operation, without external control. The operation can be configured to operate in response to read setup commands and/or read setup burst commands, carrying the read setup parameters and identifying segments of the array to be operated on by the read setup operation. The read setup commands and or read setup burst commands can be generated by a memory controller in the host for example, which monitors block status, such as by identifying read setup candidate blocks and sending commends identifying the read setup candidate blocks for read setup operations, as well as identifying cold blocks in a wear leveling operation as stale blocks, and can send commands identifying stale blocks, or can send commands during time intervals in which the memory array is idle or expected to be idle. The state machine can set a ready/busy pin on the memory device to signal the control program on the memory controller for coordination of the read setup operations.

A technology is described herein that can execute read setup operations at high speed, and more often than available in prior technologies, thereby improving the memory cell operation window by maintaining the memory cells in condition for having thresholds as set during the program operation. These technologies are particularly beneficial in large high density memory systems. For example, if there are multiple sub-blocks in one block, all the sub-blocks of one block can be subject of the read setup operation simultaneously to improve the speed of the operation. Also, if there are multiple blocks in one memory plane, multiple blocks can be subject of the read setup operation simultaneously to improve the speed of the operation. Also, if there are multiple planes in one memory device, the read setup operation can be applied simultaneously to blocks or sub-blocks in the multiple planes to improve the speed of the operation.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the technology disclosed and the scope of the following claims.

What is claimed is:

1. A memory, comprising:
   a memory array, comprising a plurality of blocks; and
   control circuits comprising logic to execute operations comprising:
      decoding a read setup burst command identifying (i) an address of a first read setup block in a set of read setup blocks and (ii) a number of read setup blocks, as candidates for read setup operations that condition cells for a subsequent and independent read operation; and
      in response to the decoding of the read setup burst command, performing a read setup burst operation on a plurality of read setup blocks of the set of read setup blocks, that conditions cells for a subsequent and independent read operation.

2. The memory of claim 1, wherein the set of read setup blocks consists of sequential blocks.

3. The memory of claim 2, wherein the number represents a number of the sequential read setup blocks and wherein the read setup burst operation includes performing read setup operations on the sequential read setup blocks of the set of read setup blocks starting from the first read setup block, as identified from the address included in the read setup burst command and continuing in sequential order of the sequential read setup blocks until a number of sequential read setup blocks that have had read setup operations performed thereon equals the number, as identified in the read setup burst command.

4. The memory of claim 3, wherein the read setup burst operation further comprises:
   prior to performing the read setup operation on each respective read setup block of the sequential read setup blocks, determining whether the respective sequential read setup block is a bad block; and
   in response to determining that the respective sequential read setup block is a bad block, skipping the read setup operation for the respective sequential read setup block and continuing the performing of the read setup burst operation in the sequential order for a subsequent read setup block in the sequence of the sequential read setup blocks.

5. The memory of claim 2, wherein the number represents a number of the sequential read setup blocks and wherein the read setup burst operation includes:
   designating the first read setup block as a current read setup block;
   setting a counter c to equal the number of the identified sequential read setup blocks included in the received read setup burst command, the number being greater than 1; and
   until the counter c equals 0, performing the following operations:
      determining whether or not the current read setup block is a bad block;
      in response to a determination that the current read setup block is not a bad block, performing a read setup operation on the current read setup block;
      upon a determination that the current read setup block is not the last block of the sequential read setup blocks, designating a next block of the sequence of the sequential read setup blocks as the current read setup block; and
      decreasing the counter c by a value of 1.

6. The memory of claim 1, wherein the operations further comprise:
receiving a read setup list of candidate read setup blocks; and
storing and maintaining the received read setup list of candidate read setup blocks in a candidate list buffer, wherein the set of read setup blocks identifies one or more of the candidate read setup blocks in the read setup list.

7. The memory of claim 6, wherein the operations further comprise:
determining whether any of the candidate read setup blocks are in sequential order as addressed in the memory; and
in response to a determination that there are candidate read setup blocks in sequential order, identifying the candidate read setup blocks that are in the sequential order as the plurality of read setup blocks of the set of read setup blocks upon which the read setup burst operation is performed.

8. The memory of claim 6, wherein the operations further comprise:
identifying a first set of candidate read setup blocks from the read setup list, the first set including two or more candidate read setup blocks that are in sequential order as addressed in the memory;
identifying a second set of candidate read setup blocks from the read setup list, the second set including two or more candidate read setup blocks that are in sequential order as addressed in the memory, the second set including candidate read setup blocks that are different from the candidate read setup blocks included in the first set;
determining that the second set of candidate read setup blocks includes more candidate read setup blocks than the first set of candidate read setup blocks; and
identifying the candidate read setup blocks from the second set as the plurality of read setup blocks of the set of read setup blocks upon which the read setup burst operation is performed.

9. The memory of claim 1, wherein the plurality of read setup blocks of the set of read setup blocks are identified in dependence upon their recent use, independent of future read operations.

10. The memory of claim 6, wherein the read setup list is generated from a least recently used (LRU) queue that identifies blocks of the memory in dependence upon their use and wherein the read setup list is generated to identify candidate read setup blocks from the LRU queue that have not been accessed for a period of time that exceeds a predetermined threshold.

11. A method of a memory performing a read setup burst operation, the memory including a memory array comprising a plurality of blocks, and the method comprising:
decoding a read setup burst command identifying (i) an address of a first read setup block in a set of read setup blocks and (ii) a number of read setup blocks, as candidates for read setup operations that condition cells for a subsequent and independent read operation; and
in response to the decoding of the read setup burst command, performing a read setup burst operation on a plurality of read setup blocks of the set of read setup blocks, that conditions cells for a subsequent and independent read operation.

12. A method of operating a memory, the method comprising:
identifying a set of read setup blocks of the memory as candidates for read setup operations;
generating a read setup burst command identifying (i) an address of a first read setup block in the set of read setup blocks and (ii) a number of read setup blocks, as candidates for read setup operations that condition cells for a subsequent and independent read operation; and
sending the generated read setup burst command to the memory to initiate performing of a read setup burst operation on a plurality of read setup blocks of the set of read setup blocks, that conditions cells for a subsequent and independent read operation.

13. The method of claim 12, further comprising:
sending a polling message to the memory requesting information regarding a status of the read setup burst operation; and
receiving a response message from the memory indicating that the read setup burst operation is not complete.

14. The method of claim 12, further comprising:
sending a polling message to the memory requesting information regarding a status of the read setup burst operation;
receiving a response message from the memory indicating that the read setup burst operation is complete; and
in response to receiving the message indicating that the read setup burst operation is complete, generating a subsequent read setup burst command and sending the subsequent read setup burst command to the memory.

15. The method of claim 12, further comprising:
sending a polling message to the memory requesting information regarding a status of the read setup burst operation; and
in response to not receiving a response message from the memory within a predetermined period of time, determining that the read setup burst operation is not complete.

16. The method of claim 12, wherein the set of read setup blocks consists of sequential blocks.

17. The method of claim 16, wherein the number represents a number of the sequential read setup blocks and wherein the read setup burst operation includes performing read setup operations on the sequential read setup blocks starting from the first read setup block, as identified from the address included in the read setup burst command, and continuing in sequential order of the sequential read setup blocks until a number of sequential read setup blocks that have had read setup operations performed thereon equals the number, as identified in the read setup burst command.

18. The method of claim 17, wherein the read setup burst operation further comprises:
prior to performing the read setup operation on each respective read setup block of the sequential read setup blocks, determining whether the respective sequential read setup block is a bad block; and
in response to determining that the respective sequential read setup block is a bad block, skipping the read setup operation for the respective sequential read setup block and continuing the performing of the read setup burst operation in the sequential order for a subsequent read setup block in the sequence of the sequential read setup blocks.

19. The method of claim 12, further comprising maintaining a read setup list of candidate read setup blocks in memory, and wherein the set of read setup blocks includes candidate read setup blocks in the read setup list.

20. The method of claim 19, further comprising:

determining whether any of the candidate read setup blocks are in sequential order as addressed in the memory; and in response to a determination that there are candidate read setup blocks in sequential order, identifying the candidate read setup blocks that are in the sequential order as the plurality of read setup blocks of the set of read setup blocks upon which the read setup burst operation is performed.

* * * * *